United States Patent
Hayakawa et al.

(10) Patent No.: US 6,296,391 B1
(45) Date of Patent: Oct. 2, 2001

(54) HYDRODYNAMIC BEARING APPARATUS

(75) Inventors: Masamichi Hayakawa; Masato Gomyo; Hideki Kanebako; Kazushi Miura, all of Nagano (JP)

(73) Assignee: Sankyo Seiki Mfg. Co., Ltd., Nagano-ken (JP)

( * ) Notice: Subject to any disclaimer, the term of this patent is extended or adjusted under 35 U.S.C. 154(b) by 0 days.

(21) Appl. No.: 09/093,098

(22) Filed: Jun. 8, 1998

(30) Foreign Application Priority Data

Jun. 9, 1997 (JP) .................................................. 9-166570
Jul. 14, 1997 (JP) .................................................. 9-203806

(51) Int. Cl.[7] .................................................. F16C 32/06
(52) U.S. Cl. .......................... 384/119; 384/107; 384/132
(58) Field of Search .................................. 384/107, 111, 384/112, 114, 119, 120, 121, 123, 124, 100, 132

(56) References Cited

U.S. PATENT DOCUMENTS

| | | | |
|---|---|---|---|
| 4,795,275 | 1/1989 | Titcomb et al. | 384/107 |
| 5,141,338 | * 8/1992 | Asada et al. | 384/114 |
| 5,559,382 | * 9/1996 | Oku et al. | 384/112 X |
| 5,791,785 | * 8/1998 | Nose et al. | 384/107 X |
| 5,806,987 | * 9/1998 | Nose et al. | 384/132 X |

FOREIGN PATENT DOCUMENTS 58-50318    3/1983   (JP) .

* cited by examiner

Primary Examiner—Thomas R. Hannon
(74) Attorney, Agent, or Firm—McAulay Nissen Goldberg Kiel & Hand, LLP

(57) ABSTRACT

A hydrodynamic bearing apparatus comprises two hydrodynamic bearing sections which have a shaft member, a bearing member fit to the shaft member with a predetermined space therein, lubricants filling the space between the shaft member and the bearing member, and which are separately placed in the axial direction of the shaft member. The lubricants of the two hydrodynamic bearing sections are separated from each other by an air layer. The lubricants are pressured by hydrodynamic generating grooves formed on the hydrodynamic bearing sections such that the shaft member and the bearing member are rotatably supported in relation to each other. The hydrodynamic generating grooves separately formed on the two hydrodynamic bearing sections are formed into an unbalanced shape such that the lubricants are moved in a predetermined direction to correct the slope of the shaft member and the bearing member when rotation is suspended. Capillary sealing sections are formed in continuation to end sections of each of the two hydrodynamic bearing sections to sustain the lubricants by capillarity. The maximum amount of the lubricant in one of the capillary sealing sections, which is located downstream in the moving direction of the lubricants, is established to be larger than the moving amount of the lubricants.

11 Claims, 9 Drawing Sheets

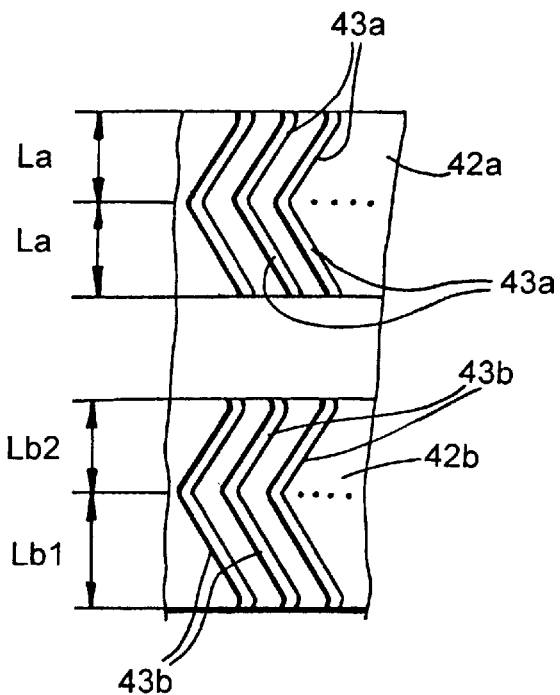
F I G. 5
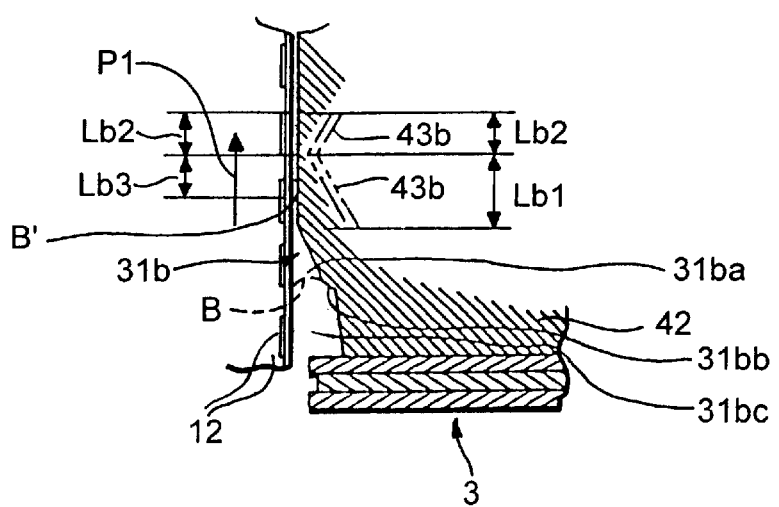
F I G. 6

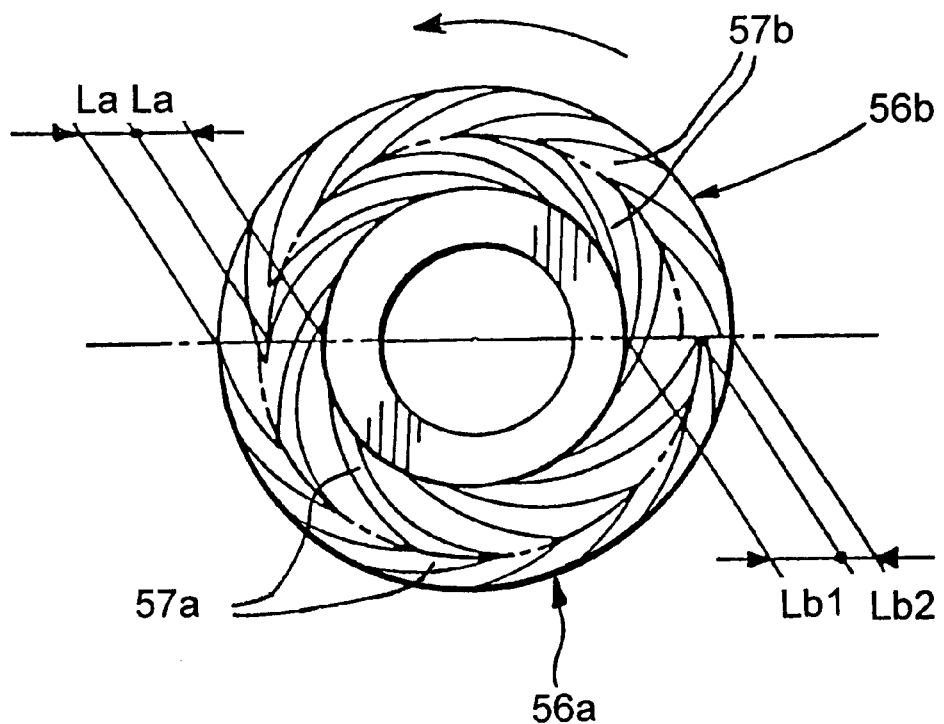
F I G. 9
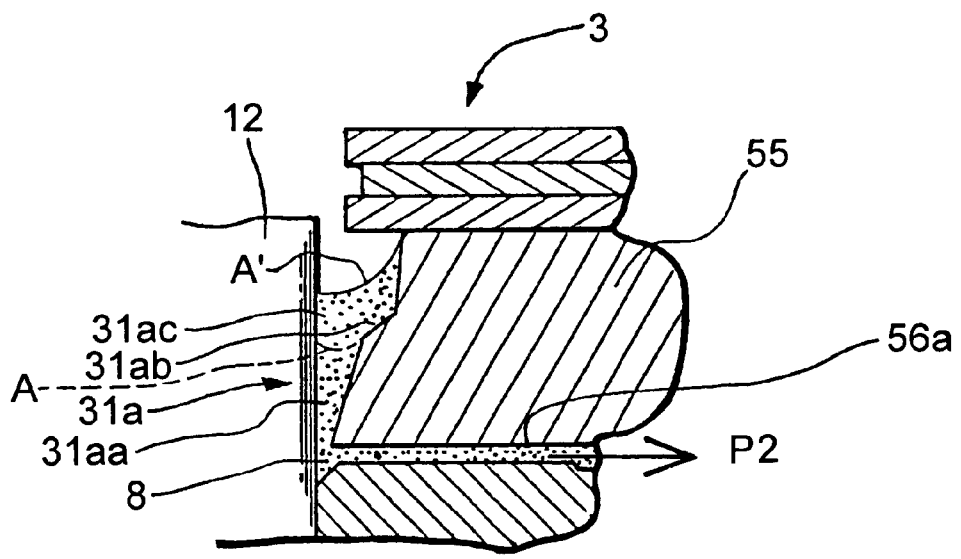
F I G. 10

HYDRODYNAMIC BEARING APPARATUS

BACKGROUND OF THE INVENTION a) Field of the Invention

The present invention relates to a hydrodynamic bearing apparatus which is structured such that a shaft member and a bearing member rotatably support each other by hydrodynamic pressure generated in a lubricant.

b) Description of the Related Art

In recent years, various hydrodynamic bearing apparatus using the hydrodynamics of lubricants, such as oil and the like, are studied and provided to respond to high-speed rotations in various apparatus such as motors and the like. These hydrodynamic bearing apparatus are such that the hydrodynamic surface on the side of a shaft member is placed across from the hydrodynamic surface on the side of a bearing member which is fit around or to the end of the shaft member via a predetermined space, at least one of the facing hydrodynamic surfaces comprises a hydrodynamic generating groove and the pressure of a lubricant between the facing surfaces of the shaft member and bearing member is increased by a pumping action of the hydrodynamic generating groove during rotation such that both members are supported in relation to each other by the hydrodynamic pressure of the lubricant.

Hydrodynamic bearing apparatus, as described above, comprise lubricants such as oil and the like (simply "lubricants" hereafter) in the bearing section; there are two types of support structures for the lubricants:

1) Partial lubricant filling structure

This is the simplest structure for a hydrodynamic bearing in which a lubricant fills only the bearing section and in which an air layer is formed between bearings. For example, in an apparatus described in Tokkai S58-50318, two hydrodynamic bearing sections are separately formed in the axial direction while a lubricant filling the inside of the two hydrodynamic bearing sections is separated by an air layer. In such a hydrodynamic bearing apparatus having a separated lubricant, the lubricant inside each hydrodynamic bearing section is maintained by surface tension while the air layer between the hydrodynamic bearing sections is open to the atmosphere via a continuing clearance hole formed on the shaft member.

2) Lubricant circulating structure

This is a structure in which the lubricant also fills the space between the bearings and both ends of the bearings are connected by a circulating hole. Therein, the lubricant is circulated so that internal pressure differences (differential pressures) generated during rotation are nullified. According to this structure, it is possible to maintain a sufficient amount of the lubricant to prolong the life of the bearings; also, it is advantageous to prevent the lubricant from leaking externally since the internal pressure differences (differential pressures) of the lubricant are always nullified by the circulating hole.

Each of the above mentioned conventional hydrodynamic bearing structures, however, has problems. In the case of the partial lubricant filling structure 1), it is difficult to control the injected amount of the lubricant, and the absolute amount of the lubricant is small due to the small space in the bearing section, causing the following problems. First, initial start up causes friction in the bearing; friction powder or sludge mixed into the lubricant increases the viscosity of the lubricant such that the bearing characteristics are deteriorated. Also, the amount of the lubricant circulated during rotation is low such that the temperature of the lubricant tends to increase, resulting in deterioration caused by heat. As a result, the life of the bearing is shortened. If the filling space for the lubricant is increased to increase the overall amount of the lubricant, the lubricant tends to leak. Furthermore, since the volume of the air layer expands/contracts due to the changes in the pressure and the temperature of the air layer between the bearings such that moving and leaks of the lubricant are the results. In order to prevent this condition, it is necessary to provide a hole continuing to the outside and the like.

On the other hand, in the case of the lubricant circulating structure 2), as explained above, the structure becomes complicated due to the circulating hole, causing poor productivity and high manufacturing costs.

OBJECT AND SUMMARY OF THE INVENTION

For the above reasons, a primary object of the present invention is to provide a hydrodynamic bearing apparatus in which a simple and low-cost structure is provided, leaks of the lubricant can be prevented while the life of the bearing is prolonged and wide applications are enabled.

In accordance with the invention, a hydrodynamic bearing apparatus comprises two hydrodynamic bearing sections which have a shaft member, a bearing member fit to the shaft member with a predetermined space therein, lubricants filling the space between the shaft member and the bearing member, and which are separately placed in the axial direction of the shaft member. The lubricants of the two hydrodynamic bearing sections are separated from each other by an air layer. The lubricants are pressured by hydrodynamic generating grooves formed on the hydrodynamic bearing sections such that the shaft member and the bearing member are rotatably supported in relation to each other. The hydrodynamic generating grooves separately formed on the two hydrodynamic bearing sections are formed into an unbalanced shape such that the lubricants are moved in a predetermined direction to correct the slope of the shaft member and the bearing member when rotation is suspended. Capillary sealing sections are formed in continuation to end sections of each of the two hydrodynamic bearing sections to sustain the lubricants by capillarity. The maximum amount of the lubricant in one of the capillary sealing sections, which is located downstream in the moving direction of the lubricants, is established to be larger than the moving amount of the lubricants.

BRIEF DESCRIPTION OF THE DRAWINGS

In the drawings:

FIG. 5 is a front open view showing radial hydrodynamic pressure generating groves;

FIG. 6 is a partially enlarged horizontal cross section showing a structure of a lower capillary sealing section;

FIG. 9 is a plan view showing specific measurements of upper and lower thrust hydrodynamic pressure generating grooves by separating the upper and lower halves;

FIG. 10 is a partially enlarged horizontal cross section showing a structure of an upper capillary sealing section;

DESCRIPTION OF THE PREFERRED EMBODIMENTS

The following describes the present invention using an embodiment applied to an HDD spindle motor with both ends of a shaft fixed.

Figure 1:
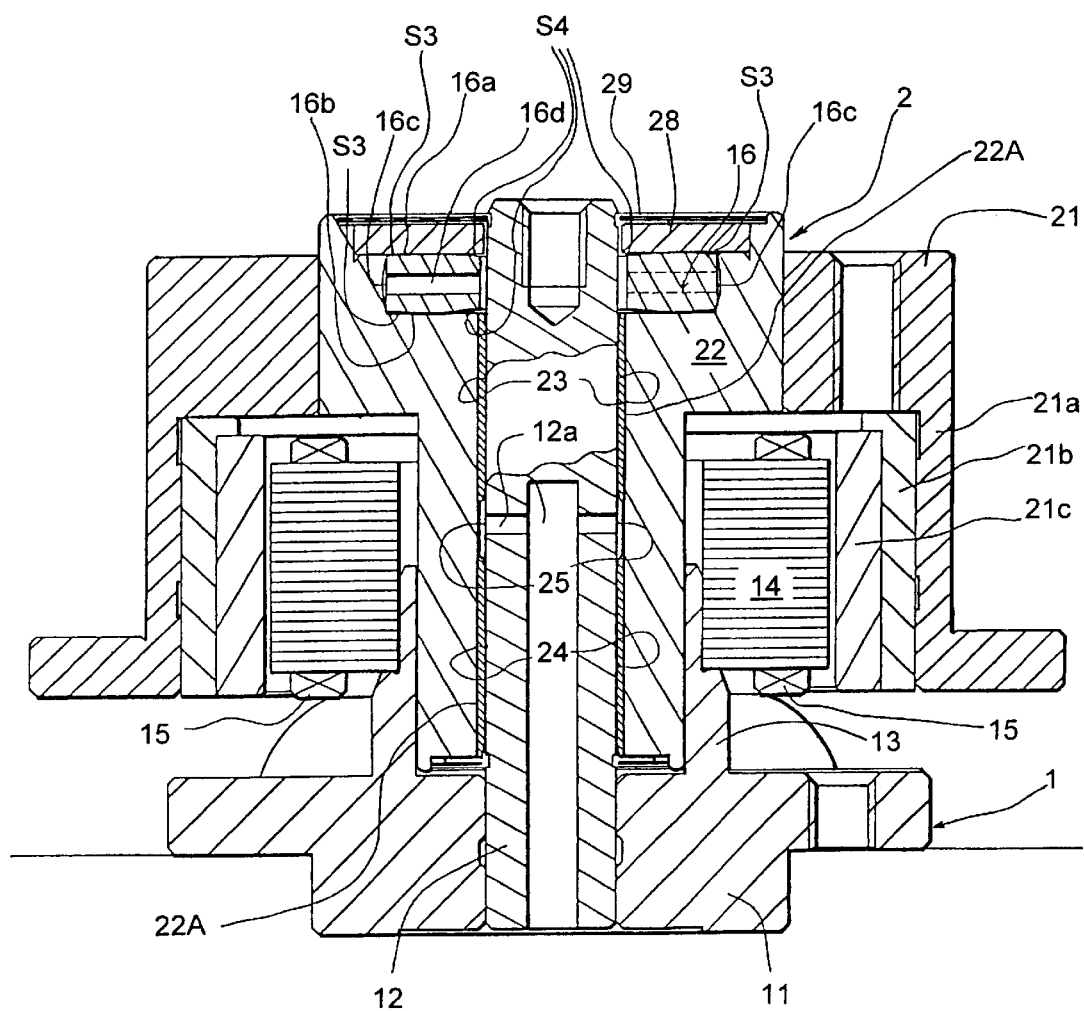
FIG. 1 is a horizontal cross section showing an example of an HDD spindle motor comprising a hydrodynamic bearing apparatus described in an embodiment of the present invention.

To explain the entire structure of the HDD spindle motor shown in FIG. 1, this HDD spindle motor comprises stator assembly 1 as a fixed member and rotor assembly 2 as a rotor member which is mounted to stator assembly 1 from the top of the figure.

Stator assembly 1 comprises frame 11 screwed onto a fixed base (not shown in the figure); at the approximate center of frame 11, fixed shaft 12 as a shaft member is formed to stretch upwards in the figure. The tip (the top end in the figure) of fixed shaft 12 is screwed onto the fixed base (not shown in the figure).

Frame 11 comprises hollow cylindrical support holder 13; stator core 14 is fitted to the outside of support holder 13. Coil 15 is wound around salient-poles of stator core 13.

On the other hand, rotor assembly 2 comprises hub 21 in order to support a predetermined recording medium, such as a magnetic disc, which is not shown in the figure. Hub 21 is rotatably supported on the outer circumference of fixed shaft 12 via bearing member 22 fixed to the center of hub 21. In other words, hub 21 comprises approximately cylindrical body 21a, having a magnetic recording medium such as a magnetic disc on its outer circumference; at the same time, driving magnet 21c is annularly mounted on the inner circumference of body 21a via back yoke 21b. Driving magnet 21c is closely placed facing the outer circumference surface of stator core 14.

Figure 2:
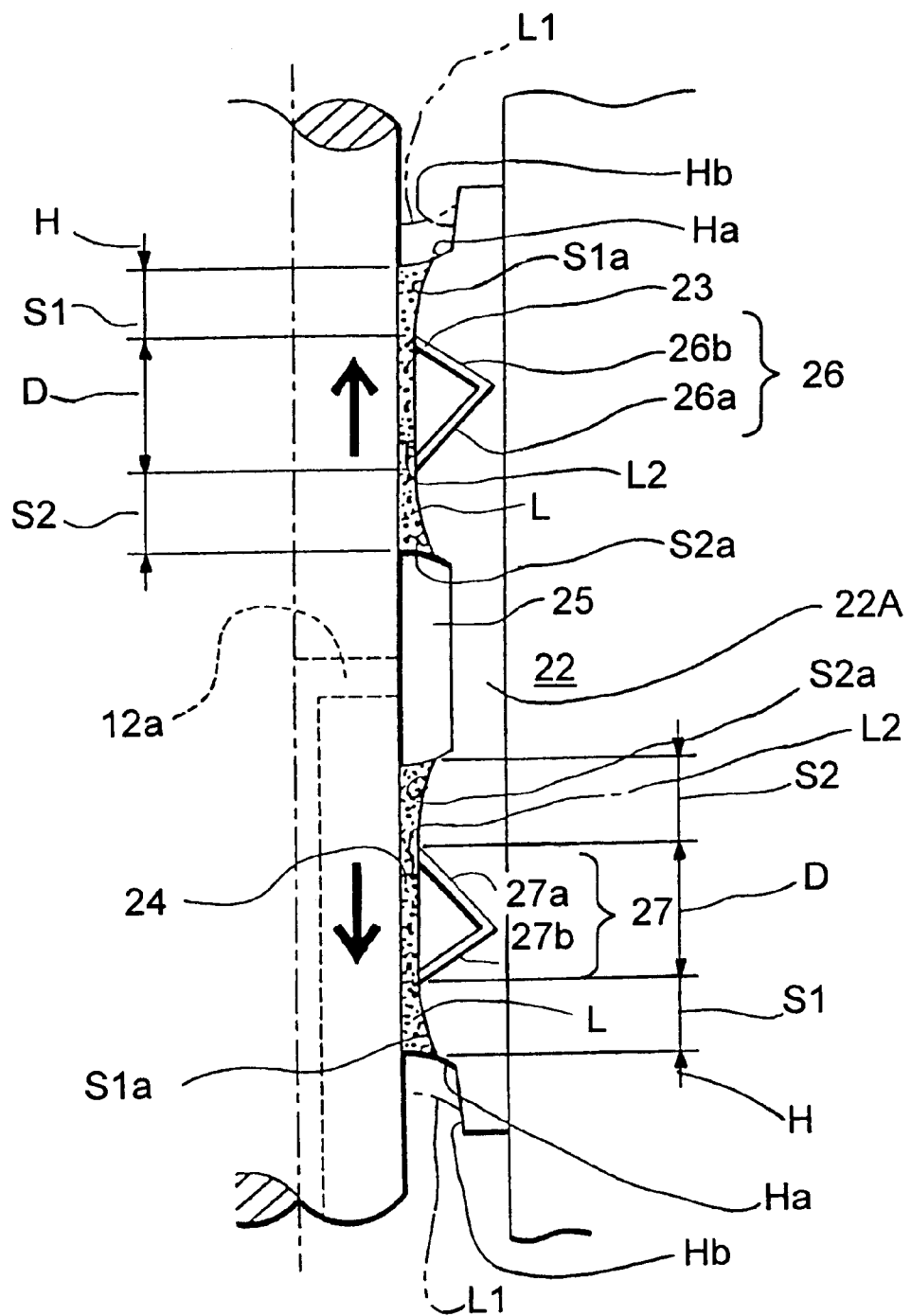
FIG. 2 is a partial horizontal cross section showing principles of the hydrodynamic bearing apparatus of FIG. 1.

FIG. 2 is an enlarged cross section of the right side of the bearing apparatus to show its detail. A pair of radial hydrodynamic bearing sections 23, 24 are formed with a predetermined distance in the axial direction between the inner circumference of bearing sleeve 22A, which is attached to the inner circumference of bearing member 22, and the outer circumference of fixed shaft 12. The inner circumference of bearing sleeve 22A of bearing member 22 belonging to radial hydrodynamic bearing section 23, 24 is apart from the outer circumference of fixed shaft 12 by a space of several μm, facing across from each other. Lubricant L, made of an oil or magnetic fluid, is placed in this space.

Lubricant L at two radial hydrodynamic bearing sections 23, 24 separately fills the spaces thereat; air layer 25 is inserted between lubricants L, L of radial hydrodynamic bearing sections 23, 24. Air layer 25 is open to the atmosphere outside the apparatus via air path 12a formed passing through fixed shaft 12.

On at least one of the facing surfaces of bearing sleeves 22A of bearing member 22 and fixed shaft 12 (the side of bearing member 22 in this embodiment), herringbone-configured radial hydrodynamic pressure generating grooves 26, 27 (only one is shown in FIG. 2) are grooved to be annularly in parallel such that hydrodynamic bearing section D is structured. When hub 21 rotates, lubricant L is pressurized due to the pumping action of radial hydrodynamic pressure generating grooves 26, 27 of hydrodynamic bearing section D; as a result, hub 21 is axially supported in the radial direction by the hydrodynamic pressure generated in lubricant L.

Each of hydrodynamic pressure generating grooves 26, 27 formed on hydrodynamic bearing section D of two radial hydrodynamic bearing sections 23, 24 are formed into an unbalanced shape with a peak like a herringbone in the axial direction. More specifically, hydrodynamic pressure generating grooves 26, 27 of radial hydrodynamic bearing sections 23, 24 are shaped with two sides of different lengths meeting at the peak; there are long grooves 26a, 27a, generating larger pressure, towards inside of the apparatus in the axial direction and short grooves 26b, 27b, generating smaller pressure, towards outside of the apparatus in the axial direction.

In other words, hydrodynamic pressure generating grooves 26, 27 are shaped to generate unbalance in the pressure in the axial direction such that lubricant L is moved to the outside in the axial direction until the unbalance in the pressure is nullified. This is effective to correct the slant between fixed shaft 12 and bearing member 22, discussed in the following.

For example, in FIG. 2, when there is a slant between fixed shaft 12 as a shaft member and bearing member 22 while rotation is suspended, the ends of fixed shaft 12 (top and bottom in the figure) contact the upper part of hydrodynamic pressure generating groove 26 and lower part of hydrodynamic pressure generating groove 27. However, in spite of the slant, once rotation starts, the following happens. In hydrodynamic bearing section D, in which hydrodynamic pressure generating grooves 26 are located, lubricant L moves upward, that is, outside in the axial direction indicated by the upward arrow by groove 26a until balancing with groove 26b. In hydrodynamic bearing section D, in which hydrodynamic pressure generating grooves 27 are located, lubricant L moves downward, that is, the outside in the axial direction indicated by the downward arrow by groove 27a until balancing with groove 27b. As a result, lubricant L moves to the above contacting parts of fixed shaft 12 and bearing sleeve 22A such that an oil film is formed thereon. Due to the pressurizing force of the oil film, the contact between the two members can be prevented while the slant is corrected such that the normal facing position is always maintained during rotation.

Also, on hydrodynamic bearing section D, on which hydrodynamic pressure generating grooves 26, 27 are formed, capillary sealing sections S1, S2 are formed such that they are sequential to each other in the axial direction (the vertical direction in the figure) in relation to the both ends of hydrodynamic bearing section D (upper and lower ends in the figure). Capillary sealing sections S1, S2 have a function to maintain lubricant L by capillarity and the oil-maintaining action by narrow spaces and slanted surfaces; they are structured such that the space in hydrodynamic bearing section D is gradually expanded as a taper by a slanted surface formed on the side of bearing sleeve 22A. In other words, with capillary sealing sections S1, S1 on the outside in the axial direction, a space is continuously expanded to the outward by slanted surface S1a while with capillary sealing sections S2, S2 on the inside in the axial direction, a space is continuously expanded inward by slanted surface S2a.

Furthermore, oil maintaining sections H, H as reservoirs, which are formed by further expanding the spaces of capillary sealing sections S1, S1, are connected to the outside of capillary sealing sections S1, S1 on the outer side in the axial direction. Oil maintaining sections H, H comprise sharp-tapering first slanted surface Ha which sharply expands in steps in the space at the outer end in the axial direction of capillary sealing sections S1, S1 on the outer side and smooth-tapering second slanted surface Hb which smoothly expands outward with a smooth slant from the outer end of first slanted surface Ha wherein oil maintaining sections H, H form a supplementary capillary sealing section for the oil-maintaining action to reserve oil and other purposes.

Oil maintaining sections H, H are structured to be reservoirs having a reserving volume five times larger than the volume of lubricant L in hydrodynamic bearing section D in which hydrodynamic pressure generating grooves 26, 27 are formed. Therefore, oil maintaining sections H, H receive the amount of lubricant L moved due to the unbalanced shape of hydrodynamic pressure generating grooves 26, 27 during rotation. In FIG. 2, two-dotted lines L1, L1 and L2, L2 indicate the liquid surface positions of lubricant on the outside and the inside, relatively, when lubricant L moves outward.

On the other hand, as shown in FIG. 1, annular thrust plate 16, constituting two thrust hydrodynamic bearing sections 16a, 16b, is fixed half way to the top end (the upper end in the figure) of fixed shaft 12. Two thrust hydrodynamic bearing sections 16a, 16b constituted by thrust plate 16 are arranged adjacent to the upper side of the radial hydrodynamic baring sections 23 which is positioned at the upper side in the figure.

In other words, the bottom surface in the figure of thrust plate 16 faces the top surface of bearing member 22 while the upper surface of thrust plate 16 faces the bottom surface of thrust pressing plate 28 which is screwed to the center of hub 21. On both surfaces in the axial direction of thrust plate 16 constituting thrust hydrodynamic bearing sections 16a, 16b, herringbone-configured thrust hydrodynamic pressure generating grooves (not shown in the figure) are annularly formed.

Also, the lubricant is separately filled in the spaces between the facing surfaces of thrust plate 16 and bearing member 22 and between thrust plate 16 and thrust pressing plate 28, that is, two thrust hydrodynamic bearing sections 16a, 16b. On the other hand, air layer 16c is inserted in the space between two thrust hydrodynamic bearing sections 16a, 16b; air layer 16c is open to the atmosphere through air path 16d formed passing through thrust plate 16 in the radius direction.

Due to the pumping action of the thrust hydrodynamic pressure generating grooves (not shown in the figure) during rotation of hub 21, the lubricant is pressurized to generate hydrodynamic pressures by which hub 21 is axially supported in the thrust direction.

Also, the hydrodynamic pressure generating grooves formed on the two thrust hydrodynamic bearing sections 16a, 16b, similar to the radial hydrodynamic pressure generating grooves, are formed into an unbalanced shape with a peak like a herringbone in the radius direction. More specifically, the hydrodynamic pressure generating grooves of thrust hydrodynamic bearing sections 16a, 16b comprise a longer groove which generates larger pressure to the inside in the radius direction of the apparatus with the peak of the herringbone shape as a center and a short groove which generates smaller pressure to the outside in the radius direction of the apparatus with the peak of the herringbone shape as a center.

In other words, the above hydrodynamic pressure generating grooves are structured to be unbalanced such that unbalance is generated in pressurizing forces in the radius direction such that the lubricant is moved to the outside in the radius direction until the unbalance in the pressures is nullified. This operation has an action to correct the slants between thrust plate 16 and bearing member 22 or between thrust plate 16 and thrust pressing plate 28, as described in the following.

For example, when a slant occurs between thrust plate 16 and bearing member 22 or between thrust plate 16 and thrust pressing plate 28 while rotation is suspended, the outer circumference of thrust plate 16 contacts the outer circumference of the hydrodynamic pressure generating grooves. However, in spite of the slant, since the lubricant is moved to the outside in the radius direction due to the unbalanced shape of the hydrodynamic pressure generating grooves as soon as rotation starts, an oil film is formed at the contacting part between thrust plate 16 and bearing member 22 or between thrust plate 16 and thrust pressing plate 28. Due to the pressurizing force of the oil film, the contact between the two members can be prevented while the slant is corrected such that the normal facing position is always maintained during rotation.

Furthermore, on thrust hydrodynamic bearing sections 16a, 16b on which the above hydrodynamic pressure generating grooves are formed, capillary sealing sections S3, S4 are formed such that they are sequential to each other in the radius direction in relation to the both ends of hydrodynamic bearing sections 16a, 16b in the radius direction. Capillary sealing sections S3, S4 have a function to maintain the lubricant by capillarity and the oil-maintaining action of narrow spaces and slanted surfaces; they are structured such that the spaces in thrust hydrodynamic bearing sections 16a, 16b are gradually expanded to the outer and inner circumferences as a taper by a slanted surface on the side of thrust plate 16. This is a similar structure as the previously mentioned radial hydrodynamic bearings.

Furthermore, an oil maintaining section, which is formed by further expanding the space of capillary sealing section S3, is connected to the outside of capillary sealing sections S3 on the outside in the radius direction. Oil maintaining sections H, H comprise a sharp-tapering first slanted surface which sharply expands in steps in the space at the outer end in the radius direction of capillary sealing sections S2 on the outer side and a smooth-tapering second slanted surface which smoothly expands outward with a smooth slant from the outer end of the first slanted surface wherein the oil maintaining section forms a supplementary capillary sealing section for the oil-maintaining action to reserve oil and other purposes.

The oil maintaining section structured to be a reservoir having a reserve volume five times larger than the volume of the lubricant in the hydrodynamic bearing section in which the hydrodynamic pressure generating grooves are formed. Therefore, the oil maintaining section receives the amount of the lubricant moved due to the unbalanced shape of the hydrodynamic pressure generating grooves during rotation.

Also, thin stopper plate 29 is formed on thrust pressing plate 28 and bearing member 22 with an absorber cloth therebetween from the direction of the side of the apparatus (top and bottom sides in the figure). Even in the worst case, dispersing of the lubricant to the outside is prevented by the absorber cloth and stopper plate 29.

According to the above embodiment, even when rotation starts while bearing members 22, 28 are slanted to fixed shaft 12 and thrust plate 16, the lubricant moves to correct the slant between fixed shaft 12 and thrust plate 16, and bearing members 22, 28 based on the outward pressurizing action of radial hydrodynamic pressure generating grooves 26, 27 and the thrust hydrodynamic pressure generating grooves, having an unbalanced shape. Therefore, oil films are constantly formed between fixed shaft 12 and bearing member 22 and between thrust plate 16 and bearing member 22, 28 such that rotation can be started or stopped without unwanted swinging rotation. In other words, fixed shaft 12, thrust plate 16 and bearing members 22, 28 are supported in a stable condition, and metal contact between both members 12, 22 are minimized.

In this case, as shown in the above embodiment, it is advantageous to provide a structure in which the reserve volume for lubricant L is sufficiently obtained for the following reasons; as a result, the oil film formation action can assuredly take place, and negative effects of mixing of friction powders into lubricant L and heat deterioration of the lubricant can be appropriately prevented.

Figure 3:
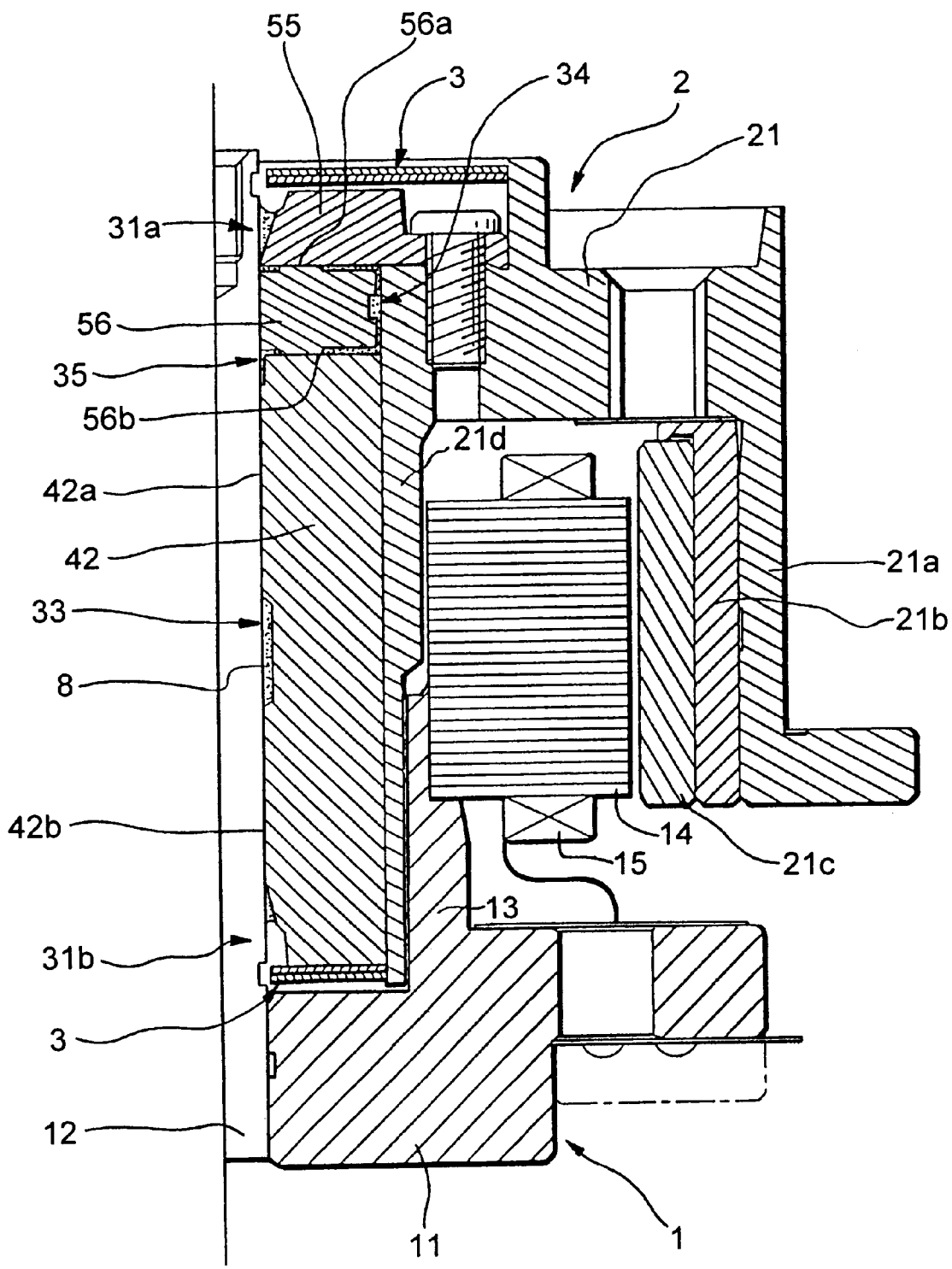
FIG. 3 is a half of a horizontal cross section showing an example of an HDD spindle motor comprising a hydrodynamic bearing apparatus described in another embodiment of the present invention.

The following explains another embodiment of the present invention in reference to drawings. The embodiment shown in FIG. 3 is an application of a structure, in which the space between bearings is filled with a lubricant, to a fixed-shaft HDD spindle motor.

Since this spindle motor has the same structure as the motor shown in FIG. 1, descriptions for the motor are omitted herein. In this embodiment, it is different from the embodiment in FIG. 1 that approximately cylindrical bearing holder 21d is formed at the center of hub 21, cylindrical radial bearing 42 is fit in the inner circumference and fixed shaft 12 is inserted in radial bearing 42.

A pair of radial hydrodynamic bearing sections 42a, 42b are arranged adjacent to each other in the axial direction on the annularly facing portions of fixed shaft 12 and radial bearing 42. At the space between radial hydrodynamic bearing sections 42a, 42b, lubricant reservoir 33 is formed by denting the inner circumference of radial bearing 42 to expand the space with fixed shaft 12.

A bearing space of several μm formed with lubricant reservoir 33 and radial hydrodynamic bearing sections 42a, 42b is continuously filled with lubricant 8. Dry-out of the lubricant in radial hydrodynamic bearing sections 42a, 42b is prevented by lubricant 8 in lubricant reservoir 33 such that the life of the apparatus is intended to be lengthened.

Figure 4:
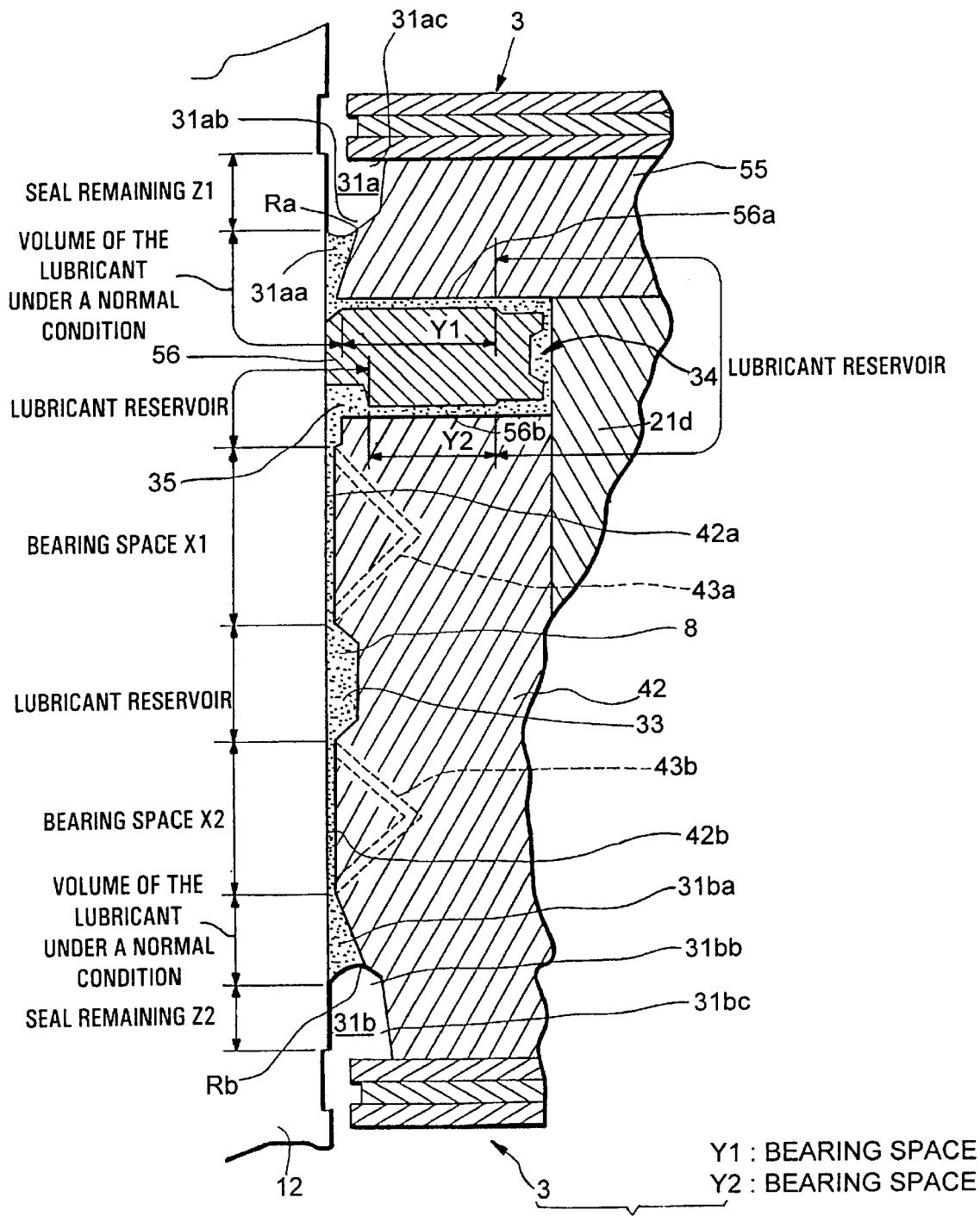
FIG. 4 is an explanatory figure in which a hydrodynamic bearing section, lubricant reservoir and capillary sealing section of the above hydrodynamic bearing apparatus, emphasizing the space between a shaft member and a bearing member.

Also, the outer surface of fixed shaft 12 at each of radial hydrodynamic bearing sections 42a, 42b and the facing inner surface of radial bearing 42 are structured to be facing hydrodynamic surfaces. On at least one of the facing hydrodynamic surfaces, as shown in FIGS. 4 and 5, a plurality of herringbone-configured radial hydrodynamic pressure generating grooves 43a, 43b are grooved to be annularly in parallel in the axial direction. In FIG. 4, the above radial hydrodynamic pressure generating grooves are not formed on the side of radial bearing 42; details of radial hydrodynamic pressure generating grooves 43a, 43b are discussed later.

During rotation of hub 21, lubricant 8 is pressurized by the pumping action of radial hydrodynamic pressure generating grooves 43a, 43b to generate hydrodynamic pressures by which hub 21 is rotatably supported in the radial direction.

As examples of lubricant 8 of this embodiment, in order to obtain a long life for lubricant 8 and preferable bearing characteristics, oils, in which trimethylolpropane (TMP) or pentaerythritol (PE) and linear or branched fat acids having 5 to 18 carbon atoms are esterified, is used; more specifically, oils having a vaporization rate of less than $10^{-7}$ g/h cm$^2$ (at 40° C.) and viscosity of less than 30 cP (at 40° C.) are used.

Furthermore, ring-configured thrust plate 56 is fixed at the vicinity of the top end (the upper end in the figure) of fixed shaft 12; thrust plate 56 is arranged adjacent to the upper side of radial baring 42. In other words, the bottom surface of thrust plate 56 is arranged to face the top surface of radial bearing 42. These facing portions form thrust hydrodynamic bearing section 56b; at the same time, the top surface of thrust plate 56 faces the bottom surface of thrust pressing plate 55 which is screwed down to the center of hub 21. These facing portions form thrust hydrodynamic bearing section 56a.

Also, as shown in FIG. 4, at the space between thrust hydrodynamic bearing sections 56a, 56b (with a shape of a square with one side open) among the spaces formed of the top, bottom and outer surfaces of thrust plate 56, the top surface of radial bearing 42 facing the bottom surface of thrust plate 56, the bottom surface of thrust pressing plate 55 facing the top surface of thrust plate 56 and the inner surface of bearing holder 21d facing the outer surface of thrust plate 56, lubricant reservoir 34 is formed thereat by denting the outer circumferences of the top and bottom end surfaces and the outer surface of thrust plate 56 such that the space between facing members is expanded.

As shown in FIG. 4, at the space between thrust hydrodynamic bearing section 56b on the bottom side and radial hydrodynamic bearing section 42a on the top side, lubricant reservoir 35 is formed thereat by denting the inner circumference of the bottom end surface of thrust plate 56 and the upper end of the inner surface of radial bearing 42 such that the space between facing members is expanded.

In the bearing space which is formed of lubricant reservoirs 34, 35 and thrust hydrodynamic bearing sections 56a, 56b, lubricant 8 is filled therein continuously from the side of radial hydrodynamic bearing sections 42a, 42b. Therefore, lubricant 8 of lubricant reservoir 34 prevents a dry-out of the lubricant in thrust hydrodynamic bearing sections 56a, 56b such that the life of the bearing is intended to be lengthened.

Also, herringbone-configured thrust hydrodynamic pressure generating grooves are annularly grooved on at least one of the bottom end surface of thrust plate 56 and the facing top end surface of radial bearing 42, and at least one of the top end surface of thrust plate 56 and the facing bottom end surface of thrust pressing plate 55.

Figure 7:
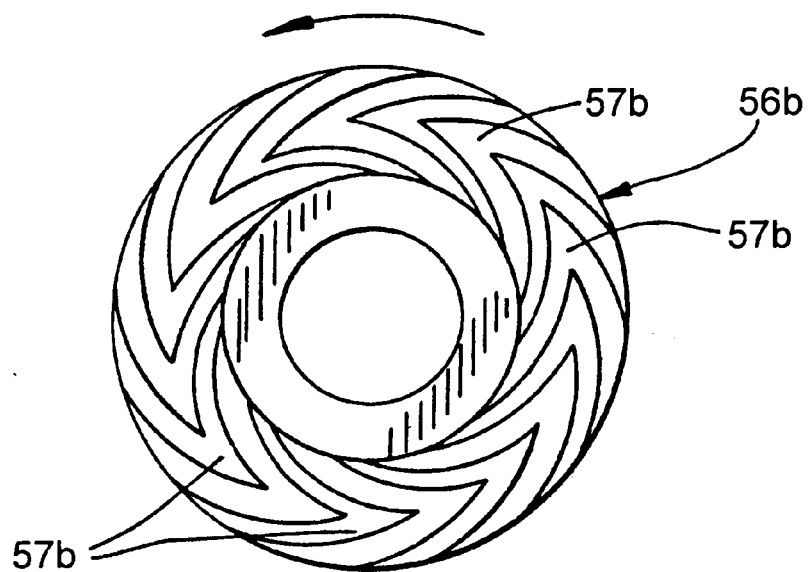
FIG. 7 is a plan view showing lower thrust hydrodynamic pressure generating grooves.

In this embodiment, herringbone-configured thrust hydrodynamic pressure generating grooves 57b, as shown in FIG. 7, are annularly formed on the bottom end surface in the axial direction of thrust plate 56 which forms thrust hydrodynamic bearing section 56b. In other words, the lengths of a pair of hydrodynamic pressure generating grooves 57b, 57b in each radius direction La, La are practically the same in the axial direction (practically La=La) at thrust hydrodynamic bearing section 56b on the bottom side, as shown in the top half of FIG. 9. Although the inner groove is slightly longer due to the relationships with the peripheral speed and the area, the grooves are formed to be practically the same length such that the pressurizing forces directing the center are balanced.

Figure 8:
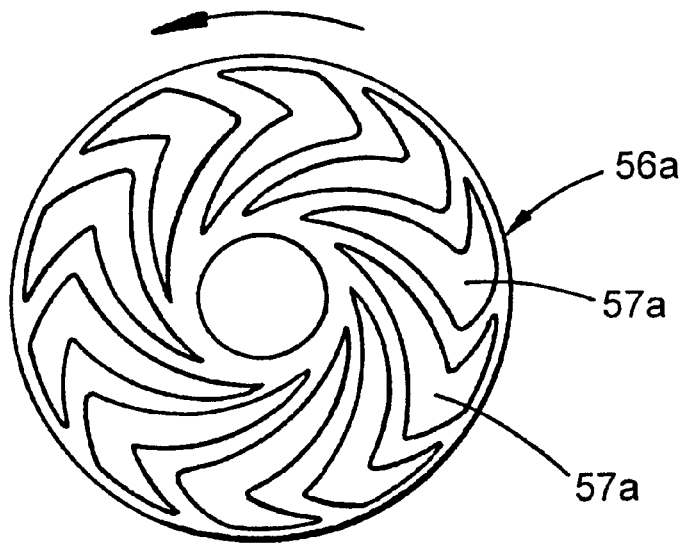
FIG. 8 is a plan view showing upper thrust hydrodynamic pressure generating grooves.

On the other hand, herringbone-configured thrust hydrodynamic pressure generating grooves 57a, as shown in FIG. 8, are annularly grooved on the top end surface in the axial direction of thrust plate 56 which forms thrust hydrodynamic bearing section 56b. In other words, as shown in the bottom half of FIG. 9, radial length Lb1 of an inside slanted groove of a pair of hydrodynamic pressure generating grooves 57a, 57a is arranged to be practically longer than radial length Lb2 of an outside slanted groove (practically Lb1>Lb2). Due to the grooves which are practically asymmetrical in the radius direction, the pressurizing force by the inside slanted groove exceeds the pressurizing force by the outside slanted groove; as a result, differential pressure P2 directing outward in the radius direction (see FIG. 10) is generated in lubricant 8.

During rotation of hub 21, lubricant 8 is pressurized by the pumping action of radial hydrodynamic pressure generating grooves 57a, 57b to generate hydrodynamic pressures by which hub 21 is rotatably supported in the thrust direction.

Thrust pressing plate 55 is connected to hub 21 after assembly of the above hydrodynamic bearing sections; however, the connecting portion adjacent to a part filled with lubricant 8 is only the above connecting portion with thrust pressing plate 55. Therefore, the remaining part to the part filled with lubricant 8 is uniformly formed to obtain complete sealing.

The connecting portion of thrust pressing plate 55 and hub 21 is structured by connecting the parts with an adhesive for complete sealing before inserting lubricant 8. Therefore, complete sealing is sufficiently provided for lubricant 8. The adhesive used for the connecting portion is to be continually filled over the entire area of the connecting portion by capillarity of an annular guiding groove (not shown in the figure) formed thereon; as a result, the completely sealed structure is perfected.

Also, thin stopper plate 3 is formed on thrust pressing plate 55 with an absorber cloth from the side (the top side in the figure); therefore, even in the worst case, dispersing of lubricant 8 to the outside is prevented.

Two radial hydrodynamic bearing sections 42a, 42b and two thrust hydrodynamic bearing sections 56a, 56b are placed together to form a continuing bearing space stretching in the axial direction. Two capillary sealing sections (lubricant sealing means) 31a, 31b, which are formed by narrowing the space between fixed shaft 12 and rotation side members 42, 55, are formed on the both ends of the bearing space including four hydrodynamic bearing sections 56a, 56b, 42a, 42b to sandwich four hydrodynamic bearing sections 56a, 56b, 42a, 42b from both sides in the axial direction.

Capillary sealing section 31b in the lower side, as shown in FIG. 6, is formed by narrowing the space between the inside wall of the outer end of radial bearing 42 in the axial direction the bottom end in the figure) and the facing outer surface of fixed shaft 12; it has a double-step sealing structure. This double-step sealing structure is formed by slanting the inside wall of the outer end of radial bearing 42 in various directions to expand the space therein and it comprises first surface tension sealing section 31ba which is formed continued from radial hydrodynamic bearing section 42b on the bottom side, second surface tension sealing section 31bc which is positioned towards the outside than first surface tension sealing section 31ba and which has a slanting angle to the axis of fixed shaft 12 smaller than first surface tension sealing section 31ba and connecting portion 31bb which is positioned between surface tension sealing sections 31ba and 31bc and which has a slanting angle to the axis of fixed shaft 12 larger than surface tension sealing sections 31ba and 31bc.

On the other hand, capillary sealing section 31a on the upper side of the figure, as shown in FIG. 10, is formed by the space between thrust pressing plate 55 forming thrust hydrodynamic bearing section 56a and fixed shaft 12; it is formed by narrowing the space between the inside wall of thrust pressing plate 55 and the outer surface of fixed shaft 12. Its structure is the same as capillary sealing section 31b on the lower side of the figure comprising first surface tension sealing section 31aa, second surface tension sealing section 31ac and connecting portion 31ab.

Upper and lower capillary sealing sections 31a, 31b are formed along the axis such that the narrow spaces forming upper and lower capillary sealing sections 31a, 31b are open to the outside in the upper and lower directions in the figure. Additionally, the inside wall of thrust pressing plate 55 and the inside wall of radial bearing 42 towards the bottom of the figure, which face fixed shaft 12 to form capillary sealing sections 31a, 31b, are formed as slanted walls such that the above spaces are continually expanded outward in the axial direction; portions of the expanding narrow spaces having the size of 20 μm to 300 μm are defined as capillary sealing sections 31a, 31b.

As mentioned previously, lubricant 8 continually fills the bearing space between two capillary sealing sections 31a, 31b including four hydrodynamic bearing sections 56a, 56b, 42a, 42b. Liquid surface positions of the upper and the lower ends of lubricant 8 while motor is suspended are arranged to be inside predetermined positions in capillary sealing sections 31a, 31b indicated as symbol A as shown in FIGS. 4, 6 and 10. These inside predetermined positions are edge portions Ra, Rb of connecting portion 31ab, 31bb (the connecting points between connecting portions 31ab, 31bb and first surface tension sealing sections 31aa, 31ba).

Also, during rotation of the motor, the position of the upper end liquid surface of lubricant 8 is maintained at the upper end position of second surface tension sealing section 31ac of upper capillary sealing section 31a as indicated by a dotted line A' in FIG. 8; the position of the lower end liquid surface is arranged to be at the position inside radial hydrodynamic bearing section 42b on the lower side of the figure indicated by a dotted line B' in FIG. 6. The movement of lubricant 8 as described herein will be mentioned later.

On the other hand, herringbone-configured hydrodynamic pressure generating grooves 43a, 43b at radial hydrodynamic bearing sections 42a, 42b, as shown in FIG. 5, are structured such that a pair of slanted grooves, which stretch as herringbones from the both ends in the axial direction of radial hydrodynamic bearing sections 42a, 42b to meet each other at the center, are annularly in parallel. Each of the slanted grooves forming hydrodynamic pressure generating grooves 43a, 43b is formed to be several μm deep wherein the slanted grooves pressurize lubricant 8 from the both ends in the axial direction to the center.

On the contrary, at lower radial hydrodynamic bearing section 42b positioned at the outermost part in the axial direction, as shown in FIG. 5, axial length Lb1 of the outer (towards the bottom in the figure) slanted groove of a pair of hydrodynamic pressure generating grooves 43b, 43b is established to be longer than axial length Lb2 of the inner (towards the top in the figure) slanted groove (Lb1>Lb2). In other words, due to the asymmetric groove shape, the upward pressurizing force by the slanted groove on the lower side exceeds the downward pressurizing force by the slanted groove on the upper side such that differential pressure P1 (see FIG. 6) is generated in lubricant 8 in one side in the axial direction (upward in the figure).

Differential pressure P1 generated by radial hydrodynamic bearing section 42b and differential pressure P2 generated by thrust hydrodynamic bearing section 56a acts on lubricant 8 which fills throughout the bearing space. In this embodiment, the shape of radial hydrodynamic pressure generating groove 43b and thrust hydrodynamic pressure generating groove 57a is determined such that the difference between differential pressure P1 generated by radial hydrodynamic bearing section 42b and differential pressure P2 generated by thrust hydrodynamic bearing section 56a (P1−P2) becomes larger than zero ((P1−P2) >0).

Therefore, lubricant 8 is deviated by moving upward due to P1>P2. Capillary sealing section 31a downstream of the moving direction of lubricant 8 (upward in the figure), as shown in FIG. 10, is established to have a space capacity for the deviated amount of lubricant 8 by its shift such that the liquid position of lubricant 8 is maintained at the upper end position of second surface tension sealing section 31ac of capillary sealing section 31a during rotation of the motor (see solid line A' in FIG. 10).

On the other hand, as described previously, capillary sealing section 31b on the upstream of the moving direction of lubricant 8 (downward in the figure) is formed at the outer end of radial hydrodynamic bearing section 42b (the bottom end in the figure). Therefore, when lubricant 8 is deviated by moving upward due to the differential pressure, as indicated by the solid line B' in FIG. 6, lubricant 8 in lower capillary sealing section 31b completely disappears while a lower part of lubricant 8 in radial hydrodynamic bearing section 42b also disappears.

More specifically, the shift of lubricant 8 due to the differential pressure during rotation of hub 21 results in a dry-out of lubricant 8 for about ¼ of axial length Lb1 of lower hydrodynamic pressure generating groove 43b; then, the liquid surface rises to a position in which axial length Lb3 of lubricant 8 left in lower hydrodynamic pressure generating groove 43b is equal to axial length Lb2 of upper hydrodynamic pressure generating groove 43b. Consequently, the hydrodynamic pressure generated in lower hydrodynamic pressure generating groove 43b lowers due to the dry-up of the lubricant such that the differential pressure is canceled.

Also, in this embodiment, the filling amount of lubricant 8, which is sandwiched between upper and lower capillary sealing sections 31a, 31b, is arranged to be five times larger than the volume of bearing spaces X1, X2, Y1, Y2 (see FIG. 4) forming hydrodynamic bearing sections 42a, 42b, 56a, 56b. This is for preventing a decrease in surface tension (a decrease in sealing action) of lubricant 8 in the case that bearing friction powders generated in initial start up are mixed into lubricant 8 and an increase in the viscosity and temperature of lubricant 8 due to the bearing friction powders mixed into lubricant 8.

In addition, as mentioned above, while the motor is suspended, the liquid position of lubricant 8 is positioned to the connecting point between connecting portions 31ab, 31bb and first surface tension sealing sections 31aa, 31ba such that lubricant 8 does not exist the section outside the above position in capillary sealing sections 31a, 31b. However, in this embodiment, in order to allow shift of lubricant 8 in the case of expansion in the volume of the lubricant due to air bubbles generated by changes in environments during the suspension of the motor, the size of capillary sealing sections 31a, 31b is established such that a sum of volumes of regions Z1, Z2 of capillary sealing sections 31a, 31b, in which lubricant 8 does not exist (indicated as seal remaining in FIG. 4), is larger than 10% of the above filling amount of lubricant 8.

According to the apparatus of this embodiment, the following procedure is generally employed to insert lubricant 8 since it is easy to operate. First, lubricant 8 is inserted from one side of a capillary sealing section (e.g. capillary sealing section 31a on the upper side in the figure). Then, lubricant 8 is guided by capillarity into the inside, and the other end of the capillary sealing section (e.g. capillary sealing section 31b on the upper side in the figure) is opened to the atmosphere. As a result, the lubricant fills throughout the bearing space.

However, it is not easy to insert lubricant 8 such that the liquid surface of lubricant 8 is positioned at a predetermined position in the capillary sealing section. Therefore, after both capillary sealing sections 31a, 31b are filled with lubricant 8 up to the outer ends, the liquid surface of lubricant 8 is positioned at the predetermined position inside the capillary sealing sections by sucking a predetermined amount of lubricant 8 into the capillary sealing sections. When the liquid surface of lubricant 8 is controlled by such a method, there is no particular mark to position the liquid surface of lubricant 8 to the predetermined position. In this embodiment, as described above, the capillary sealing sections are structured to have a double-step sealing structure such that edge portions Ra, Rb can be used to suck lubricant 8. As a result, control of the liquid surface is easily performed, and it is designed such that the liquid can be easily stopped at edge portions Ra, Rb.

Also, in the above double-step sealing structure, the tapering angle in the vicinity of the determined positions (edge positions) Ra, Rb is extremely large such that differences in the pressure is easily generated. As a result, dispersion of lubricant 8 to the outside is prevented under loads of outside forces such as vibration and impact. Also, compared to a simple single-step capillary sealing section, the above double-step sealing structure has an approximately rectangular cross section providing a larger volume. Therefore, the sealing volume can be increased without elongating the length in the axial direction of capillary sealing section 31 on the side to which lubricant moves during rotation.

Furthermore, the upper and lower capillary sealing sections are structured to have the double-step sealing structure, and edge sections Ra, Rb are arranged on both sides to provide a land mark for sucking of lubricant 8 such that control of the liquid surface position is made easier and to provide a mechanism such that the liquid can be easily stopped thereat. As a result, lubricant 8 can be inserted from either side.

According to the apparatus of this embodiment in which lubricant 8 is inserted at a predetermined amount, the position of the liquid surface of lubricant 8 is located in capillary sealing sections 31a, 31b (see FIG. 4) such that the capillary sealing action constantly functions not only during rotation but also when rotation is suspended. Therefore, lubricant 8 is maintained at the above inside predetermined position by the pulling-back force based on this capillary sealing action.

On the other hand, when a large inertial force is loaded, dynamic pressure by fluid viscous resistance of lubricant 8 is generated in capillary sealing sections 31a, 31b formed by narrow spaces; as a result, dispersion of lubricant 8 to the outside is prevented by the dynamic pressure of fluid viscous resistance of lubricant 8 as a main maintaining force.

Figure 12:
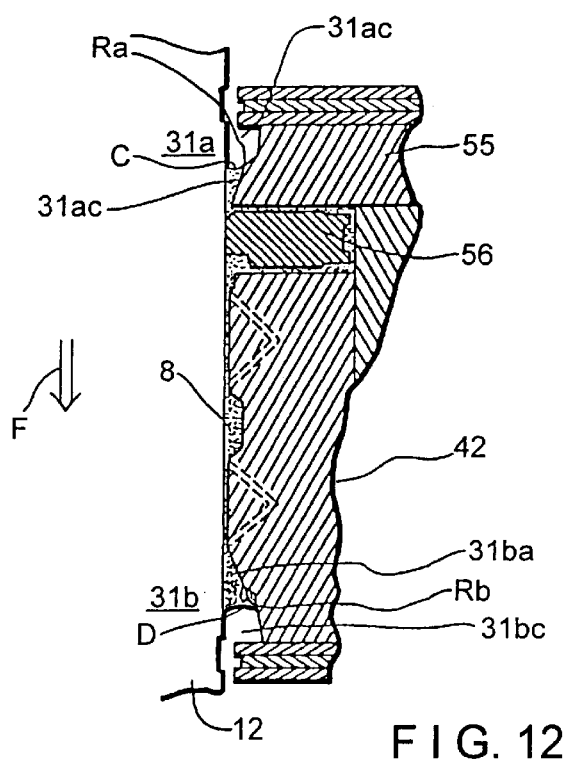
FIG. 12 explains how a lubricant is maintained in a capillary sealing section with loads of outside forces such as vibration and impact.

As shown in FIG. 12, when outside force F due to vibration or impact, which exceeds the above maintaining force, is applied from the top in the downward direction, lubricant 8 moves towards the bottom of the figure. Lubricant 8 is maintained such that the liquid surface of lubricant 8 on the upper side is positioned, as indicated by C in FIG. 12, lower than edge portion Ra in upper capillary sealing 31a and that the lower liquid surface is positioned, as indicated by D, at a position inside second surface tension sealing section 31bc of lower capillary sealing section 31b; as a result, dispersion of lubricant 8 to the outside is prevented. Also, when a force having a reversed direction from force F is applied, lubricant 8 moves upward away from the position shown in FIG. 2. Lubricant 8 is maintained such that the liquid surface on the upper end is positioned at a position inside second surface tension sealing section 31ac of upper capillary sealing section 31a; the liquid surface on the lower end is positioned higher than edge portion Rb inside lower capillary sealing section 31b.

Also, during rotation, a pressure difference is generally generated in lubricant 8 due to centrifugal force or manufacture errors of hydrodynamic pressure generating grooves. The pressure difference is notably larger than the sealing pressure; if there is a pressure difference in lubricant 8 at two exits, lubricant 8 moves to one of exits until the pressure difference is nullified resulting in a leak to the outside. In this embodiment, differential pressure P1 is intentionally generated in lubricant 8 by radial hydrodynamic bearing section 42b while differential pressure P2, which counterbalances differential pressure P1, is intentionally generated in lubricant 8 by thrust hydrodynamic bearing section 56a. As a result, shifts of lubricant 8 is intentionally carried out by a small amount to nullify the difference in the differential pressures of lubricant 8 (P1–P2) such that an equilibrium is achieved. In other words, the surface of lubricant 8 moves from A to A' in capillary sealing section 31a (see FIG. 10); the surface of lubricant 8 moves from B to B' in capillary sealing section 31b (see FIG. 6). Then, capillary sealing section 31a, located on the downstream of the moving direction of lubricant 8, is established to have a space volume allowing the deviated volume by the shifts of lubricant 8 due to the difference in the differential pressures. Therefore, dispersion of lubricant 8 to the outside during rotation is prevented.

The above equilibrium of lubricant 8 is achieved by balancing between the pressurizing force of lubricant 8 to other bearing members (to the side of lubricant reservoir 33), which is generated by thrust hydrodynamic pressure generating groove 57a of thrust hydrodynamic bearing section 56a on one of outermost ends, and the pressurizing force of lubricant 8 to other bearing members (to the side of lubricant reservoir 33), which is generated by radial hydrodynamic pressure generating groove 43b of radial hydrodynamic bearing section 42b on the other outermost end; consequently, three lubricants reservoirs 33, 34, 35 are pressurized. Therefore, air dissolved in lubricant in lubricant reservoirs 33, 34, 35 is never separated or vaporized such that the volume of the lubricant is not expanded. As a result, dispersion of lubricant 8 to the outside during rotation is prevented.

Also, when the motor rotates, bearing friction occurs due to initial start up; if friction powders are mixed into lubricant 8, there are possibilities that surface tension of lubricant 8 lowers while viscosity of lubricant 8 increases. In this embodiment, the mount of lubricant 8 inserted is five times larger than the volume of bearing spaces X1, X2, Y1, Y2 forming hydrodynamic bearing sections 42a, 42b, 56a, 56b. Therefore, even if the friction powders are mixed into lubricant 8, the sufficient amount of lubricant 8 prevents lowering of surface tension of lubricant 8; as a result, dispersion of lubricant 8 to the outside during rotation is further prevented.

Inventors of the present invention confirmed the above by experiment. The following shows the results.

A similar hydrodynamic bearing structure as above was employed. The structure of thrust hydrodynamic bearing sections 56a, 56b was as follows:

| | |
|---|---|
| outside diameter: | 8 mm; |
| inside diameter: | 3.5 mm; |
| bearing spaces Y1, Y2: | 15 μm; and |
| volume of the spaces: | 0.6 μl. |

The structure of radial hydrodynamic bearing sections 42a, 42b was as follows:

| | |
|---|---|
| axial diameter (inside diameter): | 3.5 mm; |
| height: | 3 mm; |
| bearing spaces X1, X2: | 4 μm; and |
| volume of the spaces: | 0.13 μl; |

Here, Y1, Y2, X1, X2 were average spaces considering hydrodynamic pressure generating grooves; total bearing spaces is:

0.6 μl×2 units+0.13 μl×2 units=1.48 μl.

Also, an ordinary oil was used as a lubricant.

Three models of bearings for experiment, as shown in Table 1, standards 1, 2, 3 were prepared by varying the amount of a sealing oil in capillary sealing sections 31a, 31b and the volume of lubricant reservoirs 33, 35, 34 (corresponding to oil reservoirs 1, 2, 3 of Table 1).

TABLE 1

| Sealing + Amount of Oil in Lubricant Reservoir | Standard 1 | Standard 2 | Standard 3 |
|---|---|---|---|
| Amount of Sealing Oil (initialized value) | 0.1 | 0.3 | 4.0 |
| Lubricant Reservoir (radial/radial) | 1.0 | 2.0 | 4.0 |
| Lubricant Reservoir (radial/thrust) | 1.2 | 1.2 | 1.2 |
| Lubricant Reservoir (thrust/thrust) | 1.3 | 3.9 | 5.2 |
| Total Amount of Oil | 3.6 | 7.4 | 14.4 |
| Ratio to the volume of the Bearing Spaces | 2.43 | 5.0 | 9.7 |

Ratios of the amount of oil inserted and the volume of the bearing spaces forming the hydrodynamic bearing sections were: standard 1 is 2.43, standard 2 is 5.0 and standard 3 was 9.7.

Starting and suspension of three models, standards 1, 2, 3, at high temperature was performed 500 times; the result are shown in Table 2.

TABLE 2

| | Sealing Action | Appearance of Oil |
|---|---|---|
| Standard 1 | x | The oil became gel-like due to mixed friction powders. |
| Standard 2 | ○ | Although mixed friction powders were found in the oil, the sealing action was not affected by the mixed friction powders |
| Standard 3 | ⊙ | The condition of oil did not change from that during the insertion of the oil. |

In standard 1, the oil was almost gel-like due to mixed friction powders. In standard 2, although mixed friction powders were found in the oil, the sealing action was not affected by the mixed friction powders. In standard 3, the condition of the oil did not change during and after insertion of the oil. In other words, it was concluded that surface tension of the oil was not lowered as long as the amount of the oil (lubricant) inserted was more than five times than the volume of the bearing spaces (X1, X2, Y1, Y2) forming hydrodynamic bearing sections (42a, 42b, 56a, 56b).

Also, in this embodiment, the amount of the oil inserted was established to be more than five times than the volume of the bearing spaces X1, X2, Y1, Y2, forming hydrodynamic bearing sections 42a, 42b, 56a, 56b, as described above. Therefore, even when the friction powders were mixed into lubricant 8 due to rotation, the sufficient amount of lubricant 8 prevented an increase in viscosity of lubricant 8 such that desired bearing characteristics could be obtained.

In addition, due to having lubricant 8 in the amount of more than five times the volume of the bearing spaces X1, X2, Y1, Y2, forming hydrodynamic bearing sections 42a, 42b, 56a, 56b, an increase in the temperature of the lubricant was prevented; as a result, deterioration by heat in the early stage of the life of bearings could be prevented.

Furthermore, compared to a conventional lubricant sealing means such as a pole piece configuration, capillary sealing sections 31a, 31b of the present invention has a simpler structure with slanted surfaces. As a result, manufacturing processes can be simplified to increase productivity.

Moreover, the structure of the above apparatus can be applied to either bearing structures, a rotational shaft type or fixed shaft type; therefore, use of the bearing is not limited.

In this embodiment, the radial hydrodynamic pressure generating grooves are formed on at least one side of two facing surfaces of fixed shaft 12 and rotational members 42a, 42b. However, regarding radial hydrodynamic pressure generating grooves 43b on the bottom side of the figure, it is more preferable to form them on fixed shaft 12.

This is due to the following reasons. If radial hydrodynamic pressure generating grooves 43b is formed on rotational member 42b, when the lower part of radial hydrodynamic pressure generating grooves 43b is partially exposed while lubricant 8 moves upward during rotation, air is blown out from exposed radial hydrodynamic pressure generating grooves 43b during rotation. Then, the disturbed surface of lubricant 8, due to the above air and the exposed and rotating radial hydrodynamic pressure generating grooves 43b having an uneven surface, tends to contain air bubbles; the air bubbles are captured in lubricant reservoir 33. As a result, there is a higher possibility of dispersion of the lubricant to the outside during rotation due to the expansion of the lubricant. If radial hydrodynamic pressure generating grooves 43b are formed on fixed shaft 12, the disturbance on the surface of lubricant 8 can be suppressed even when a part of radial hydrodynamic pressure generating grooves 43b are exposed, compared to radial hydrodynamic pressure generating grooves 43b formed on rotational member 42b. As a result, the air bubbles are prevented from being captured in the lubricant such that dispersion of the lubricant to the outside during rotation can be prevented. If radial hydrodynamic pressure generating grooves 43b, which are exposed while lubricant 8 moves during rotation, are formed on fixed rotation, other hydrodynamic pressure generating grooves, that is, hydrodynamic pressure generating grooves 43a, 56a, 56b which are not exposed during rotation, can be formed on either sides (or on both sides of) the fixed member or rotational member.

When the difference in the differential pressures is established to be (P1−P2)<0, lubricant 8 moves downwards to achieve an equilibrium such that lower radial hydrodynamic pressure generating grooves 43b is not exposed. Therefore, in this case, generation of air bubbles can be minimized even if radial hydrodynamic pressure generating grooves 43b are formed on rotational members 42a, 42b. On the other hand, the surface position of lubricant 8 lowers by shifting such that it is positioned at thrust hydrodynamic bearing section 56a on the upper side. The possibility that air bubbles are generated on the surface of lubricant 8 due to thrust hydrodynamic pressure generating grooves 57a increases thereat. However, the air bubbles can be released to the atmosphere due to strong centripetal force (a force in which lubricant 8 receiving centrifugal force pushes the air bubbles with a lighter specific gravity to the inside). Therefore, a few air bubbles described above are not a major concern.

If hydrodynamic pressure generating grooves 57a of thrust hydrodynamic bearing section 56a is intentionally formed into a shape which does not pressurize lubricant 8 towards the outside, that is, the shape in which an inward pressurizing force achieves an equilibrium as shown in FIG. 7, it is inevitable that one of slanted grooves (either inside or outside) of hydrodynamic pressure generating grooves 57a, 57a practically becomes longer such that lubricant 8 is pressurized to one side (either inside or outside) due to manufacture errors. There is no problem if the shape of the grooves is such that lubricant 8 is pressurized to the outside due to the manufacture errors (one of the slanted grooves of hydrodynamic pressure generating grooves 57a, 57a, which is on the inside in the radius direction, practically becomes longer), the same as this embodiment. However, if the shape of the grooves are such that lubricant 8 is pressurized to the inside (one of slanted grooves of hydrodynamic pressure generating grooves 57a, 57a, which is on the outside in the radius direction, practically becomes longer), it is problematic that negative pressures are generated in lubricant reservoirs 33, 34, 35 when an equilibrium is achieved in lubricant 8 as described above. Therefore, in order to make the pressures in lubricant reservoirs 33, 34, 35 positive, as shown in this embodiment, it is necessary to intentionally form hydrodynamic pressure generating grooves 57a of thrust hydrodynamic bearing section 56a such that lubricant 8 is pressurized to the outside. Naturally, hydrodynamic pressure generating grooves 43a of lower radial hydrodynamic bearing section 42b is needed to be intentionally formed such that lubricant 8 is pressurized upward. It is inevitable that the shape of hydrodynamic pressure generating grooves 57a of thrust hydrodynamic bearing section 56a and hydrodynamic pressure generating grooves 43a of lower radial hydrodynamic bearing section 42b tends to be such that lubricant 8 is pressurized to one side. Nonetheless, this pressurized force is negligibly small compared to intentionally generated differential pressures P1, P2.

Solubility of air to lubricant 8 is proportional to the pressure and inversely proportional to the temperature. Since hydrodynamic bearing sections 42a, 42b, 56a, 56b have an extremely high pressure environment (e.g. it exceeds 10 atmospheres in some cases) in use (during rotation of hub 21), continuous rotation of the rotational member eventually leads to saturation; as a result, high solubility of air at the pressure is achieved such that air dissolves in the lubricant. Thereafter, if rotation stops, lubricant 8 returns to the atmospheric pressure such that dissolved air reaches supersaturation. The supersaturation is gradually resolved at the vapor-liquid surface of lubricant 8 (the surface of lubricant 8 open to the atmosphere). However, in a hydrodynamic bearing apparatus having lubricant reservoirs 33, 34, 35 between hydrodynamic bearing sections 42a, 42b, 56a, 56b, air bubbles may be generated if there is a trigger such as a foreign object which can be a core of dust or friction powder in lubricant reservoirs 33, 34, 35. If there is a change in the pressure and the temperature of the environment, generation of air bubbles can be triggered.

If air bubbles are generated while rotation is suspended, as described above, the volume of lubricant 8 expands due to the air bubbles; as a result, lubricant 8 is pushed out from capillary sealing sections 31a, 31b such that leaks of the lubricant happens.

Figure 11:
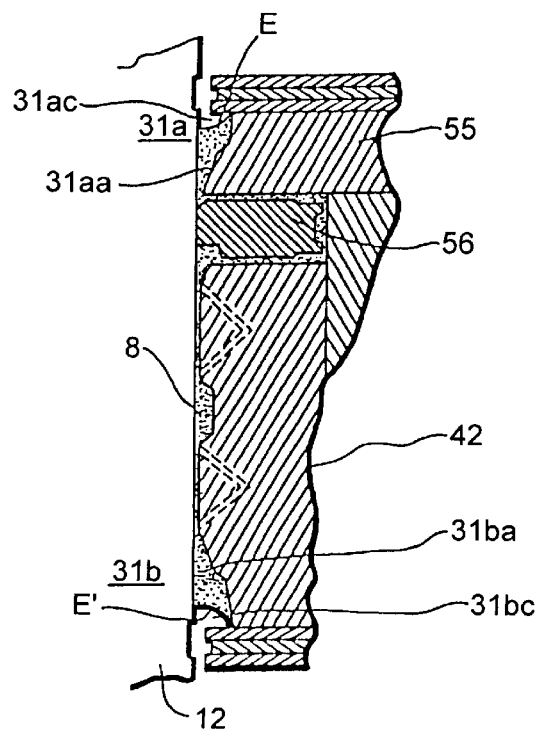
FIG. 11 explains how a lubricant is maintained in a capillary sealing section during expansion of air bubbles.

In general, solubility of air in an oil is about 10% by weight at a normal pressure and temperature. If the oil is left under an environment with 0.6 atmosphere such that air bubbles are generated, the volume of the oil is expected to expand by 10%. In this embodiment, as described previously, the size of capillary sealing sections 31a, 31b is established such that the sum of portions Z1, Z2 of capillary sealing sections 31a, 31b, which are not filled with the lubricant, is more than 10% of the volume of lubricant 8 inserted therein. Therefore, in spite of expansion in the volume of the lubricant, lubricant 8 is maintained such that the upper liquid surface of lubricant 8 is positioned at the upper end inside upper capillary sealing section 31a as indicated by E in FIG. 11 and the lower liquid surface of lubricant 8 is positioned at the lower end of lower capillary sealing section 31b as indicated by E'. As a result, dispersion of lubricant 8 to the outside is prevented.

In this embodiment, the size of capillary sealing sections 31a, 31b is established such that the sum of portions Z1, Z2 of capillary sealing sections 31a, 31b, which are not filled with the lubricant, is more than 10% of the volume of lubricant 8 inserted therein; as a result, lubricant 8 is maintained the position described above. If the volume of X2 and X2 are arranged larger than the above, lubricant 8 is maintained at the position inside capillary sealing sections 31a, 31b (a position inside the end position).

The air bubbles, which are generated in lubricant reservoirs 33, 34, 35 while rotation is suspended, disappear, as described previously, because the pressure in lubricant reservoirs 33, 34, 35 is turned into positive pressure.

Figure 13:
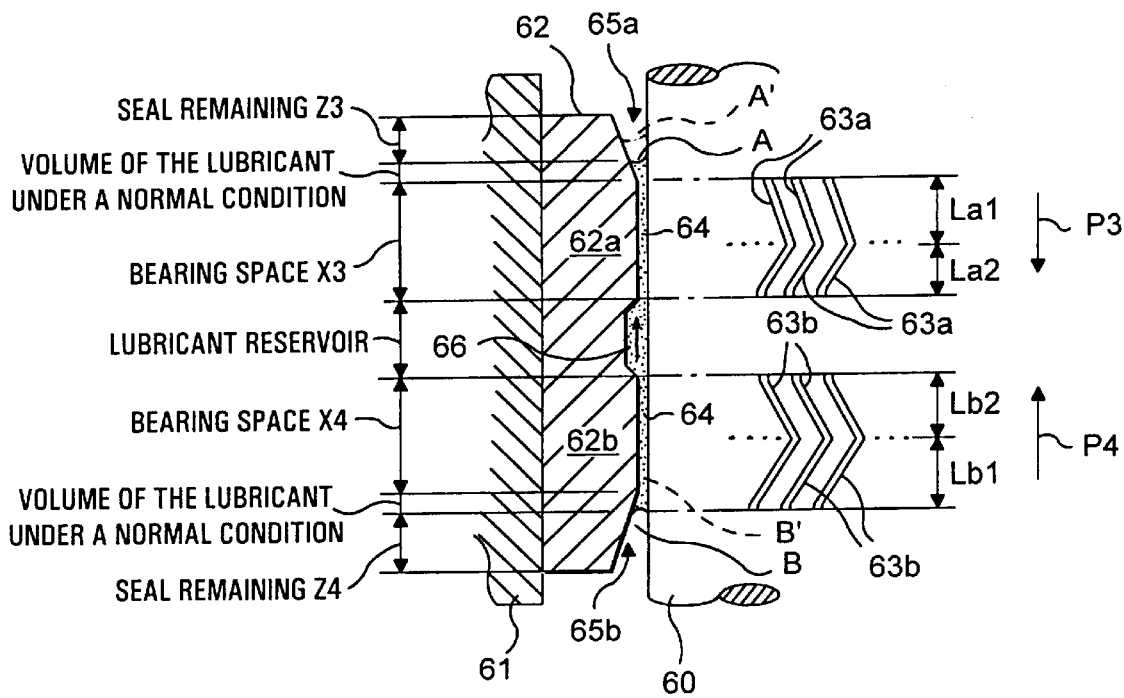
FIG. 13 is a horizontal cross section showing an embodiment in which the present invention is applied to a hydrodynamic bearing apparatus comprising two radial hydrodynamic bearing sections.

The following embodiment shown in FIG. 13 is such that the present invention is applied to a hydrodynamic bearing apparatus having two radial hydrodynamic bearing sections 62a, 62b adjacent to each other in the axial direction wherein shaft member 60 and radial bearing 62 fixed to cylindrical member 61 are rotatably supported via two radial hydrodynamic bearing sections 62a, 62b in relation to each other.

Two radial hydrodynamic bearing sections 62a, 62b are structured of shaft member 60 and radial bearing 62 which are annular facing members. Two radial hydrodynamic bearing sections 62a, 62b are placed away from each other on the sides of lubricant reservoir 66 which is formed by expanding a space between shaft member 60 and the dented inner surface of radial bearing 62.

Herringbone-configured radial hydrodynamic generating grooves 63a, 63b are grooved arranged annularly in parallel on at least one of the inner surfaces forming radial hydrodynamic bearing sections 62a, 62b at radial bearing 62 and the facing outer surface facing the above inner surface of shaft member 60 (more preferably on the fixed member, as described above) as shown in an open view of the figure. The space between the two facing surfaces is filled with predetermined lubricant 64 made of an oil or magnetic fluid.

In other words, two radial hydrodynamic bearing sections 62a, 62b are formed adjacent to each other to form a continual bearing space stretching in the axial direction. Two capillary sealing sections 65a, 65b are formed at both ends in the axial direction of the bearing space including two radial hydrodynamic bearing sections 62a, 62b by narrowing the space between radial bearing 62 and shaft member 60 such that radial hydrodynamic bearing section 62a, 62b are sandwiched by two capillary sealing sections 65a, 65b in the axial direction. The narrow spaces forming capillary sealing sections 65a, 65b are directly connected to the space forming the bearing section of radial hydrodynamic bearing sections 62a, 62b.

Upper and lower capillary sealing sections 65a, 65b are formed in the axial direction such that the narrow spaces forming capillary sealing sections 65a, 65b are open to the outside in the upper and lower direction of the figure. The inner wall of radial bearing 62, which faces shaft member 60 to form the narrow spaces of capillary sealing sections 65a, 65b, is formed to be a slanted wall which continually expands to increase the size of the spaces to the outside in the axial direction.

As described previously, lubricant 64 is continually filled in the bearing space between two capillary sealing sections 65a, 65b including two radial hydrodynamic bearing sections 62a, 62b. The liquid surfaces of lubricant 64 at the upper and lower ends of capillary sealing sections 65a, 65b are positioned at predetermined positions inside capillary sealing sections 65a, 65b while rotation is suspended, as indicated by solid lines A, B in the figure.

In a pair of hydrodynamic pressure generating grooves 63a, 63a at upper radial hydrodynamic bearing section 62a, axial length La1 of a slanted groove on the outside (towards the top in the figure) is established longer than axial length La2 of a slanted groove on the inside (towards the bottom) (La1>La2). In other words, since the grooves are formed asymmetric in the axial direction, the downward pressurizing force by the upper slanted groove exceeds the upward pressurizing force by the lower slanted groove such that predetermined differential pressure P3 is generated in lubricant 64 in one direction in the axial direction (toward the bottom in the figure).

On the other hand, in a pair of hydrodynamic pressure generating grooves 63b, 63b at lower radial hydrodynamic bearing section 62b, axial length Lb1 of a slanted groove on the outside (towards the bottom in the figure) is established longer than axial length Lb2 of a slanted groove on the inside (towards the top) (Lb2>Lb2). In other words, since the grooves are formed asymmetric in the axial direction, the upward pressurizing force by the lower slanted groove exceeds the downward pressurizing force by the upper slanted groove such that predetermined differential pressure P4 is generated in lubricant 64 in one direction in the axial direction (toward the top in the figure).

Both differential pressure P3 generated by upper radial hydrodynamic bearing section 62a and differential pressure P4 generated by lower radial hydrodynamic bearing section 62b act on lubricant 64 which continually fills the bearing space. In this embodiment, the shape of radial hydrodynamic pressure generating grooves 63b, 63a is determined such that the difference between differential pressure P3 generated by upper radial hydrodynamic bearing section 62a and differential pressure P4 generated by lower radial hydrodynamic bearing section 62b (P4−P3) becomes more than zero ((P4−P3)>0).

Also, one of capillary sealing sections 65a, 65b, to which lubricant 64 moves due to the difference in the differential pressures (P4−P3), that is, capillary sealing section 65a, is established to have a space with a volume which allows a deviated amount of lubricant 64 by the shift.

In addition, in this embodiment, the amount of lubricant 64 sandwiched between upper and lower capillary sealing sections 65a, 65b is established to be more than five times of the volume of bearing spaces X3, X4 forming radial hydrodynamic bearing sections 62a, 62b.

Furthermore, in this embodiment, the size of capillary sealing sections 65a, 65b is established such that a sum of volumes of regions Z3, Z4 of capillary sealing sections 65a, 65b, in which lubricant 64 does not exist (indicated as seal remaining in FIG. 13), is larger than 10% of the above filling amount of lubricant 64.

In this embodiment, capillary sealing sections 65a, 65b have a single-step sealing structure; however, these can be replaced with capillary sealing sections having the previously mentioned double-step sealing structure.

In an apparatus structured as above, lubricant 64 slightly moves upward to nullify the difference in differential pressures (P4−P3) during rotation. To achieve an equilibrium (balance) of lubricant 64, the liquid surface of lubricant 64 on the upper end is maintained inside upper capillary sealing section 65a as indicated by a dotted line A'; the liquid surface on the lower end is maintained at a position inside lower radial hydrodynamic bearing section 62b as indicated by a dotted line B'.

The above equilibrium (balance) is achieved by a balance between the pressurizing force of lubricant 64, which is generated by radial hydrodynamic pressure generating groove 63a of radial hydrodynamic bearing section 62a on one of the outermost ends, toward radial hydrodynamic bearing 62a (towards lubricant reservoir 66) and the pressurizing force of lubricant 64, which is generated by radial hydrodynamic pressure generating groove 63b of radial hydrodynamic bearing section 62b on other outermost end, toward radial hydrodynamic bearing 62a (towards lubricant reservoir 66). As a result, lubricant reservoir 66 is pressurized. Separation and vaporization of air resolved in lubricant 64 do not take place such that the volume of the lubricant does not expand. As a result, dispersion of lubricant 64 to the outside during rotation can be prevented.

Also, lubricant 64 moves upward by the difference in differential pressures (P4−P3). Capillary sealing section 65a on the downstream side of lubricant 64 (towards the top of the figure) is established to have a space with a volume allowing the deviated amount of lubricant 64 due to the shift. Therefore, even during rotation, the upper liquid surface position of lubricant 64 is maintained inside capillary sealing section 65a (indicated by a dotted line A' in FIG. 13).

On the other hand, as described previously, capillary sealing section 65b on the upstream side of lubricant 64 (towards the bottom of the figure) is formed at the outer edge in the axial direction of radial hydrodynamic bearing section 62b (the bottom part of the figure). Therefore, when lubricant 64 moves upward by the difference in the differential pressures to deviate, as indicated by a dotted line B' in FIG. 10, lubricant 64 in lower capillary sealing section 65b completely disappears while the lower part of lubricant 64 in radial hydrodynamic bearing section 62b partially disappears. Due to the dry-out of lubricant 64, the hydrodynamic pressure generated by lower hydrodynamic pressure generating groove 63b lowers to nullify the differential pressures. As explained in the previous embodiment, if radial hydrodynamic generating groove 63b, which is exposed by moving lubricant 64 during rotation, is formed on the fixed member side, engulfing of air bubbles can be suppressed such that dispersion of lubricant 64 can be further prevented. Naturally, other hydrodynamic pressure generating grooves, that is, radial hydrodynamic pressure generating grooves 63a, can be formed on either the fixed member side or rotational member side (or on both sides).

Also, the filling amount of lubricant 64 is established to be more than five times of the volume of bearing spaces X3, X4 forming radial hydrodynamic bearing sections 62a, 62b; therefore, lowering of surface tension of lubricant 64 due to mixing of friction powders can be prevented. As a result, dispersion of lubricant 64 to the outside during rotation can be prevented.

Similarly, the filling amount of lubricant 64 is established to be more than five times of the volume of bearing spaces X3, X4 forming radial hydrodynamic bearing sections 62a, 62b; therefore, an increase in viscosity of lubricant 64 is prevented. In turn, an increase in temperature of the lubricant is prevented such that the life of the bearing is prolonged.

Additionally, capillary sealing sections 65a, 65b of the present invention have a simple structure with slanted surfaces, compared to a conventional lubricant sealing means such as a pole piece configuration. As a result, manufacturing processes can be simplified to increase productivity. Also, the structure of the above apparatus can be applied to either bearing structures, a rotational shaft type or fixed shaft type; therefore, use of the bearing is not limited.

Furthermore, the size of capillary sealing sections 65a, 65b is established such that a sum of volumes of regions Z3, Z4 of capillary sealing sections 65a, 65b, in which lubricant 64 does not exist, is larger than 10% of the above filling amount of lubricant 64. Therefore, in spite of volume expansion of lubricant 64 due to air bubbles, dispersion of lubricant 64 to the outside during rotation can be prevented.

In the following embodiment shown in FIG. 14, the present invention is applied to a hydrodynamic bearing apparatus comprising two thrust hydrodynamic bearing sections 72a, 72b which are formed adjacent to each other in the axial direction wherein thrust plate 72 fixed on shaft member 70 and cylindrical member 71 are rotatably supported in relation to each other via two thrust hydrodynamic bearing sections 72a, 72b.

Two thrust hydrodynamic bearing sections 72a, 72b are structured of surface facing sections which face the upper and lower surfaces of thrust plate 72 and concave portion formed on cylindrical member 71 to sandwich thrust plate 72 from the top and the bottom directions.

On at least one of the surface facing sections facing the upper and lower surfaces of thrust plate 72 forming thrust hydrodynamic bearing sections 72a, 72b and the upper and the lower surfaces of cylindrical member 71, herringbone-configured radial hydrodynamic pressure generating grooves 57a, as shown in FIG. 8, are grooved to be annularly in parallel in the axial direction while lubricant 74 made of an oil or magnetic fluid fills a space between the above facing surfaces.

At each of thrust hydrodynamic bearing sections 72a, 72b, in other words, as shown in the lower half of FIGS. 8 and 9, radial length Lb1 of an inside slanted groove of a pair of hydrodynamic pressure generating grooves 57a, 57a is arranged to be practically longer than radial length Lb2 of an outside slanted groove (practically Lb1>Lb2). Due to the grooves which are practically asymmetrical in the radius direction, the pressurizing force by the inside slanted groove exceeds the pressurizing force by the outside slanted groove. As a result, differential pressure P5 directing outward in the radius direction is generated in lubricant 74 in thrust hydrodynamic bearing section 72a; differential pressure P6 directing outward in the radius direction is generated in lubricant 74 in thrust hydrodynamic bearing section 72b.

As shown above, the shape of thrust hydrodynamic pressure generating grooves is determined such that the difference between differential pressure P5 generated by upper radial hydrodynamic bearing section 72a and differential pressure P6 generated by lower radial hydrodynamic bearing section 72b (P6−P5) becomes more than zero ((P6−P5)>0).

Also, two thrust hydrodynamic bearing sections 72a, 72b are formed separate from each other by a predetermined distance in the axial direction; however, these thrust hydrodynamic bearing sections 72a, 72b are also connected to each other to form a bearing space with a shape of a square with one side open. Two capillary sealing sections 75a, 75b are formed at both ends of the bearing space including thrust hydrodynamic bearing sections 72a, 72b by narrowing the space between cylindrical member 71 and thrust plate 72. The narrow spaces forming capillary sealing sections 75a, 75b are directly connected to the space forming the bearing sections of thrust hydrodynamic bearing sections 72a, 72b.

Figure 14:
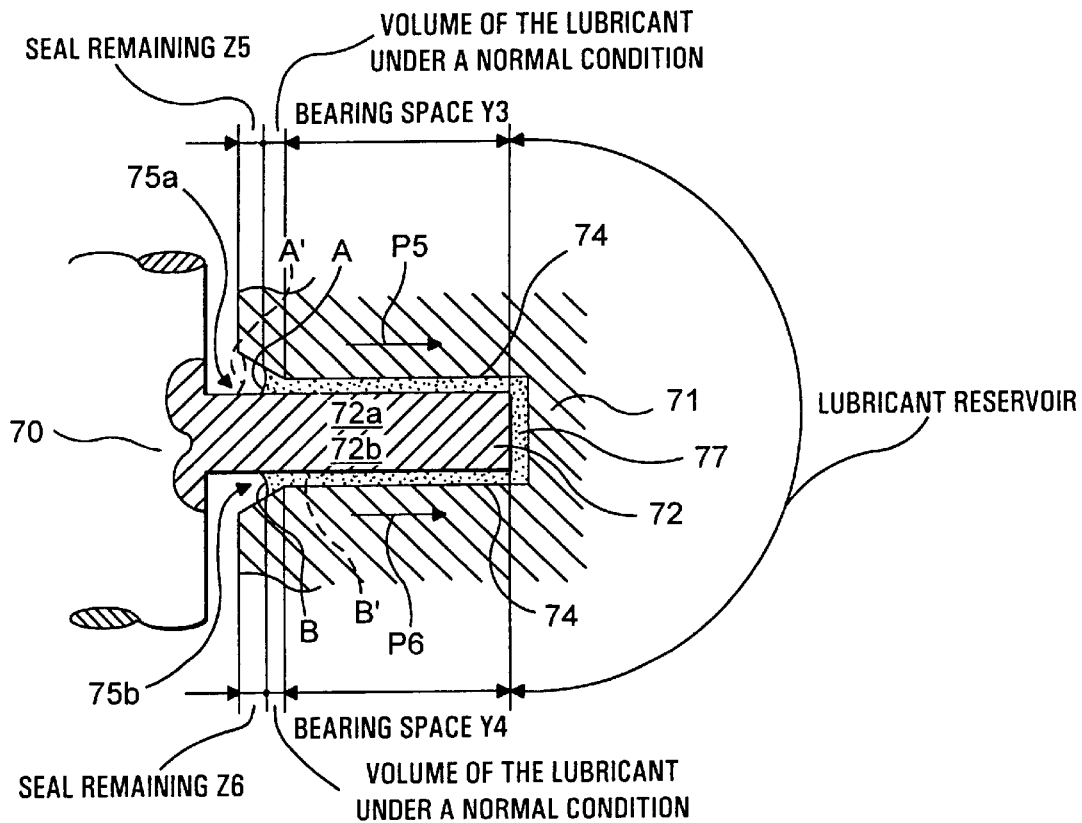
FIG. 14 is a horizontal cross section showing an embodiment in which the present invention is applied to a hydrodynamic bearing apparatus comprising two thrust hydrodynamic bearing sections.

Upper and lower capillary sealing sections 75a, 75b in FIG. 14 are formed such that the narrow spaces forming capillary sealing sections 75a, 75b are open to the inside. The inside wall of cylindrical member 71, which faces thrust plate 72 to form the narrow spaces of capillary sealing sections 75a, 75b, is a slanted wall which continually expands to increase the size of the spaces to the inside.

As described previously, lubricant 74 continually fills the bearing space between two capillary sealing sections 75a, 75b including two thrust hydrodynamic bearing sections 72a, 72b. The liquid surface positions at both ends of lubricant 74 while rotation is suspended are established to be at predetermined positions inside capillary sealing sections 75a, 75b as indicated by solid lines A, B in FIG. 14.

Also, lubricant reservoir 77 similar to the one of the previous embodiment is positioned between the space between thrust hydrodynamic bearing sections 72a, 72b, that is, between the outer surface of thrust plate 72 and facing cylindrical member 71.

Additionally, one of capillary sealing sections 75a, 75b, to which lubricant 74 moves due to the difference in the differential pressures (P6−P5), that is, capillary sealing section 75a, is established to have a space with a volume which allows a deviated amount of lubricant 74 by a shift.

Furthermore, the filling amount of lubricant 74, which is sandwiched between upper and lower capillary sealing sections 75a, 75b, is arranged to be five times larger than the volume of bearing spaces Y3, Y4 forming thrust hydrodynamic bearing sections 72a, 72b.

Moreover, the size of capillary sealing sections 75a, 75b is established such that a sum of volumes of regions Z5, Z6 of capillary sealing sections 75a, 75b, in which lubricant 74 does not exist (indicated as seal remaining in FIG. 14), is larger than 10% of the above filling amount of lubricant 74.

In this embodiment, capillary sealing sections 75a, 75b can be replaced with capillary sealing sections having the double-step sealing structure described in the previous embodiment.

In an apparatus structured as above, lubricant 74 slightly moves upward to nullify the difference in differential pressures (P6−P5) during rotation. To achieve an equilibrium (balance) of lubricant 74, the liquid surface of lubricant 74 on the upper end is maintained inside upper capillary sealing section 75a as indicated by a dotted line A'; the liquid surface on the lower end is maintained at a position inside lower thrust hydrodynamic bearing section 72b as indicated by a dotted line B'.

The above equilibrium (balance) is achieved by a balance between the pressurizing force of lubricant 74, which is generated by thrust hydrodynamic bearing section 72a on one of the outermost ends, toward other thrust hydrodynamic bearing 72a (towards lubricant reservoir 77) and the pressurizing force of lubricant 74, which is generated by thrust hydrodynamic bearing section 72b on other outermost end, toward other thrust hydrodynamic bearing 72a (towards lubricant reservoir 77). As a result, lubricant reservoir 77 is pressurized. Separation and vaporization of air resolved in lubricant 74 do not take place such that the volume of the lubricant does not expand. As a result, dispersion of lubricant 74 to the outside during rotation can be prevented.

Also, lubricant 74 moves from the side of capillary sealing section 72b to the side of 72a to deviate by the difference in differential pressures (P6−P5). Capillary sealing section 75a on the downstream side of lubricant 74 (towards the top of FIG. 12) is established to have a space with a volume allowing the deviated amount of lubricant 74 due to the shift. Therefore, even during rotation, the upper liquid surface position of lubricant 74 in FIG. 14 is maintained inside capillary sealing section 75a (indicated by a dotted line A' in FIG. 14).

On the other hand, as described previously, capillary sealing section 75b on the upstream side of lubricant 74 (towards the bottom of FIG. 14) is formed at the inside of thrust hydrodynamic bearing section 72b. Therefore, when lubricant 74 moves to deviate by the difference in the differential pressures, as indicated by a dotted line B' in FIG. 14, lubricant 74 in lower capillary sealing section 75b in FIG. 14 completely disappears while the inside part of lubricant 74 in thrust hydrodynamic bearing section 72b partially disappears. Due to the dry-out of lubricant 74, hydrodynamic pressure generated by lower hydrodynamic pressure generating groove 73b in FIG. 11 lowers to nullify the differential pressures.

As explained in the previous embodiment, if thrust a hydrodynamic generating groove (a thrust hydrodynamic generating groove on the side of thrust hydrodynamic bearing section 72b), which is exposed by moving lubricant 74 during rotation, is formed on the fixed member side, engulfing of air bubbles can be suppressed such that dispersion of lubricant 74 can be further prevented. Naturally, the other hydrodynamic pressure generating groove, that is, the upper thrust hydrodynamic pressure generating groove (a thrust hydrodynamic generating groove on the side of thrust hydrodynamic bearing section 72a), can be formed on either the fixed member side or the rotational member side (or on both sides).

Also, the filling amount of lubricant 74 is established to be more than five times of the volume of bearing spaces Y3, Y4 forming thrust hydrodynamic bearing sections 72a, 72b; therefore, lowering of surface tension of lubricant 74 due to mixing of friction powders can be prevented. As a result, dispersion of lubricant 74 to the outside during rotation can be further prevented.

Similarly, the filling amount of lubricant 74 is established to be more than five times of the volume of bearing spaces X3, X4 forming thrust hydrodynamic bearing sections 72a, 72b; therefore, an increase in viscosity of lubricant 74 is prevented. In turn, an increase in temperature of the lubricant is prevented such that the life of the bearing is prolonged.

Additionally, capillary sealing sections 75a, 75b of the present invention have a simple structure with slanted surfaces, compared to a conventional lubricant sealing means such as a pole piece configuration. As a result, manufacturing processes can be simplified to increase productivity. Also, the structure of the above apparatus can be applied to either bearing structures, a rotational shaft type or fixed shaft type; therefore, use of the bearing is not limited.

Furthermore, the size of capillary sealing sections 75a, 75b is established such that a sum of volumes of regions Z5, Z6 of capillary sealing sections 75a, 75b, in which lubricant 74 does not exist, is larger than 10% of the above filling amount of lubricant 74. Therefore, in spite of volume expansion of lubricant 74 due to air bubbles, dispersion of lubricant 74 to the outside during rotation can be prevented.

The above described the embodiments of the present invention by the present inventors in detail; however, one is not limited to the above embodiments, and various modifications are possible within the scope of the present invention.

For example, a hydrodynamic pressure generating groove of the present invention is not limited to be herringbone-configured; the present invention can be applied to a hydrodynamic pressure generating groove of any shape.

Also, the present invention can be similarly applied to a hydrodynamic bearing apparatus used for other than a HDD motor as described as above.

As described above, in a hydrodynamic bearing apparatus of the present invention the liquid positions of the lubricant while rotation is suspended are positioned inside capillary sealing sections formed on the outside of hydrodynamic bearing sections such that the capillary sealing action continually functions, by using the pulling-back force of this capillary sealing action on the lubricant, the lubricant can be maintained at a predetermined position inside the capillary sealing sections, during rotation, differential pressures are intentionally generated in the lubricant in the hydrodynamic bearing sections by unbalanced hydrodynamic pressure generating grooves and the capillary sealing section, to which the lubricant moves, is established to have a volume to allow the moving amount of the lubricant when the lubricant moves to nullify the differential pressures of the lubricant such that an equilibrium is achieved. Therefore, dispersion of the lubricant to the outside during rotation can be prevented while a sufficient amount of the lubricant is maintained.

In this case, especially if a sufficient amount of the lubricant is maintained, the above mentioned oil film formation action can assuredly take place, and negative effects by mixing of friction powders into the lubricant and heat deterioration of the lubricant can be appropriately prevented. As a result, reliability of the hydrodynamic bearing apparatus can be further improved.

Also, if the filling amount of the lubricant is established to be more than five times larger than the volume of the bearing spaces forming the hydrodynamic bearing sections, even when the friction powders produced by bearing friction due to initial start up are mixed into the lubricant, dispersion of the lubricant to the outside during rotation can be prevented without lowering the surface tension of the lubricant in the capillary sealing sections which are filled with sufficient of the lubricant. At the same time, when the friction powders are mixed into the lubricant, the sufficient amount of the lubricant prevented an increase in viscosity and temperature of the lubricant such that desired bearing characteristics could be obtained; as a result, deterioration by heat in the early stage of the life of bearings could be prevented.

While the foregoing description and drawings represent the preferred embodiments of the present invention, it will be obvious to those skilled in the art that various changes and modifications may be made therein without departing from the true spirit and scope of the present invention.

What is claimed is:

1. A hydrodynamic bearing apparatus comprising:

two hydrodynamic bearing sections which have a shaft member;

a bearing member fit to said shaft member with a predetermined space therein; and lubricants filling said space between said shaft member and said bearing member;

and which are separately placed in the axial direction of said shaft member; wherein:

said lubricants of said two hydrodynamic bearing sections are separated from each other by an air layer;

said lubricants are pressured by hydrodynamic generating grooves formed on said hydrodynamic bearing sections such that said shaft member and said bearing member are rotatably supported in relation to each other;

said hydrodynamic generating grooves separately formed on said two hydrodynamic bearing sections are formed into an unbalanced shape such that said lubricants are moved in a predetermined direction to correct the slope of said shaft member and said bearing member when rotation is suspended;

capillary sealing sections having slanted surfaces with the same radius of curvature are formed in continuation to end sections of each of said two hydrodynamic bearing sections to sustain said lubricants by capillarity; and the maximum amount of said lubricant in one of said capillary sealing sections, which is located downstream in the moving direction of said lubricants, is established to be larger than the moving amount of said lubricants.

2. The hydrodynamic bearing apparatus described in claim 1 in which each of said hydrodynamic bearing sections is structured of a radial hydrodynamic bearing section and the moving direction of said lubricant to correct the slope of said shaft member and said bearing member is established to be outside of the axial direction of said shaft member.

3. The hydrodynamic bearing apparatus described in claim 1 in which each of said hydrodynamic bearing section is structured of a thrust hydrodynamic bearing section and the moving direction of said lubricants to correct the slope of said shaft member and said bearing member is established to be outside of the radius direction of said shaft member.

4. The hydrodynamic bearing apparatus described in claim 1 in which a reservoir section is formed at one of said capillary sealing sections, which is located downstream in the moving direction of said lubricants, having a maximum reserve amount more than five times larger than the amount of said lubricant in said hydrodynamic bearing section.

5. The hydrodynamic bearing apparatus described in claim 4 in which said reservoir is structured to receive said lubricant which moves until the unbalance of pressure on said lubricants due to the unbalanced shape of said hydrodynamic generating grooves is nullified.

6. A hydrodynamic bearing apparatus comprising:

a shaft member; and a bearing member which is engaged to said shaft member wherein:

two hydrodynamic bearing sections are formed between said shaft member and said bearing member to be rotatable in relation to each other by continuously filling the space between said two hydrodynamic bearing sections with a lubricant;

said two hydrodynamic bearing sections comprise hydrodynamic generating grooves which are unbalanced such that said lubricant moves in a predetermined direction when rotation is started;

capillary sealing sections are formed outside each of said hydrodynamic bearing sections to maintain said lubricant such that the surface of said lubricant is located at a predetermined position inside said hydrodynamic bearing section when rotation is suspended;

the maximum amount of one of said capillary sealing sections, which is on the side to receive said moving lubricant, is established to be appropriate to receive the moving amount of said lubricant; and the reserve amount of said lubricant is established to be more than five times of the volume of a bearing space forming each of said hydrodynamic bearing sections.

7. The hydrodynamic bearing apparatus described in claim 6 in which said hydrodynamic bearing sections are selected to be one of the following:

two separated radial hydrodynamic bearing sections;

two separated thrust hydrodynamic bearing sections; and a thrust hydrodynamic bearing section and a radial hydrodynamic bearing section.

8. The hydrodynamic bearing apparatus described in claim 7 in which said unbalanced hydrodynamic generating grooves are separately formed on each of said two hydrodynamic bearing sections;

said unbalanced hydrodynamic generating grooves are also formed in a shape such that differential pressures, on said bearing spaces of said two hydrodynamic bearing sections when rotation is started, is caused in said lubricant; and each of said unbalanced hydrodynamic generating grooves is formed into a shape such that said bearing spaces are pressured by said lubricant when said lubricant moves such that a predetermined differential pressure, which is a difference between said differential pressures, is nullified to achieve an equilibrium.

9. The hydrodynamic bearing apparatus described in claim 8 in which:

one of said capillary sealing sections, located on the side to receive said moving lubricant, comprises a first surface tension sealing section, at which the liquid surface is located when rotation is suspended, and a second surface tension sealing section, at which the liquid surface is located during rotation; and a connecting section is located between said first surface tension sealing section and said second surface tension sealing section wherein the slanting angle to facing surfaces of said first and second surface tension sealing sections is larger than the slanting angle forming each of said sealing sections.

10. The hydrodynamic bearing apparatus described in claim 7 in which the size of said capillary sealing sections is established such that the sum of volumes of parts of said capillary sealing sections, which are not filled with said lubricant, becomes more than 10% of the filling amount of said lubricant.

11. The hydrodynamic bearing apparatus described in claim 10 in which one of said capillary sealing sections, located on the side from which said lubricant moves away, comprises a first surface tension sealing section, at which the liquid surface is located when rotation is suspended, and a second surface tension sealing section, at which the liquid surface is located during rotation, and a connecting section is located between said first surface tension sealing section and said second surface tension sealing section wherein the slanting angle to facing surfaces of said first and second surface tension sealing sections is larger than the slanting angle forming each of said sealing sections.

* * * * *